US010134198B2

(12) United States Patent
Miller

(10) Patent No.: US 10,134,198 B2
(45) Date of Patent: Nov. 20, 2018

(54) IMAGE COMPENSATION FOR AN OCCLUDING DIRECT-VIEW AUGMENTED REALITY SYSTEM

(71) Applicant: Adobe Systems Incorporated, San Jose, CA (US)

(72) Inventor: Gavin Stuart Peter Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/133,025

(22) Filed: Apr. 19, 2016

(65) Prior Publication Data

US 2017/0301145 A1     Oct. 19, 2017

(51) Int. Cl.
| | |
|---|---|
| G06T 19/20 | (2011.01) |
| G06F 3/00 | (2006.01) |
| G06F 3/01 | (2006.01) |
| G06T 3/40 | (2006.01) |
| G06T 19/00 | (2011.01) |

(52) U.S. Cl.
CPC .............. *G06T 19/20* (2013.01); *G06F 3/005* (2013.01); *G06F 3/013* (2013.01); *G06T 3/40* (2013.01); *G06T 19/006* (2013.01)

(58) Field of Classification Search
None
See application file for complete search history.

(56) References Cited

U.S. PATENT DOCUMENTS

| | | |
|---|---|---|
| 5,517,580 A | 5/1996 | Markandey |
| 6,636,627 B1 | 10/2003 | Oosawa |
| 8,036,451 B2 | 10/2011 | Redert |

(Continued)

FOREIGN PATENT DOCUMENTS

WO     WO-2013155217     10/2013

OTHER PUBLICATIONS

Bell,"Learning Local Evidence for Shading and Reflectance", Proceedings Eighth IEEE International Conference on Computer Vision. ICCV 2001, Dec. 2001, 12 pages.

(Continued)

*Primary Examiner* — Xiao Wu
*Assistant Examiner* — Mohammad H Akhavannik
(74) *Attorney, Agent, or Firm* — Wolfe-SBMC

(57) ABSTRACT

Image compensation for an occluding direct-view augmented reality system is described. In one or more embodiments, an augmented reality apparatus includes an emissive display layer for presenting emissive graphics to an eye of a user and an attenuation display layer for presenting attenuation graphics between the emissive display layer and a real-world scene to block light of the real-world scene from the emissive graphics. A light region compensation module dilates an attenuation graphic based on an attribute of an eye of a viewer, such as size of a pupil, to produce an expanded attenuation graphic that blocks additional light to compensate for an unintended light region. A dark region compensation module camouflages an unintended dark region with a replica graphic in the emissive display layer that reproduces an appearance of the real-world scene in the unintended dark region. A camera provides the light data used to generate the replica graphic.

19 Claims, 28 Drawing Sheets

(56) References Cited

U.S. PATENT DOCUMENTS

| | | | |
|---|---|---|---|
| 8,289,318 | B1 | 10/2012 | Hadap et al. |
| 8,687,001 | B2 | 4/2014 | Shim |
| 9,285,872 | B1* | 3/2016 | Raffle .................... G06F 3/012 |
| 9,299,188 | B2 | 3/2016 | Karsch et al. |
| 9,613,454 | B2 | 4/2017 | Karsch et al. |
| 2002/0128060 | A1 | 9/2002 | Belhumeur |
| 2006/0103728 | A1 | 5/2006 | Ishigami |
| 2010/0046802 | A1 | 2/2010 | Watanabe |
| 2012/0068913 | A1 | 3/2012 | Bar-Zeev et al. |
| 2013/0121567 | A1 | 5/2013 | Hadap |
| 2013/0147798 | A1 | 6/2013 | Karsch |
| 2013/0271489 | A1 | 10/2013 | Lévesque et al. |
| 2016/0328884 | A1* | 11/2016 | Schowengerdt ......... G02B 6/32 |
| 2017/0176818 | A1* | 6/2017 | Shi .................... G02F 1/134309 |
| 2017/0255814 | A1* | 9/2017 | Kaehler .................. G06F 21/32 |
| 2017/0256095 | A1* | 9/2017 | Bani-Hashemi ...... G06T 19/006 |

OTHER PUBLICATIONS

Grosse, "Ground truth dataset and baseline evaluations for intrinsic image algorithms", In International Conference on Computer Vision, Oct. 2009, 10 pages.

Karsch, "Depth Extraction from Video Using Non-parametric Sampling—Supplemental Material", University of Illinois at Urbana-Champaign, Microsoft Research New England and Microsoft Research, http://kevinkarsch.com/, presented at ECCU 2012, 11, 2012, 11 pages.

Karsch, "Depth Extraction from Video Using Non-parametric Sampling", Pattern Analysis and Machine Intelligence, IEEE Transactions on, 2014., 2014, 14 pages.

Karsch, "Rendering Synthetic Objects into Legacy Photographs", ACM Transactions on Graphics (TOG), Dec. 1, 2011, 12 pages.

Khan, "Image-Based Material Editing", ACM Trans. Graph. 25, Jul. 2006, 10 pages.

Lee, "Geometric Reasoning for Single Image Structure Recovery", In CVPR, 2009, 8 pages.

Lopez—"Compositing Images Through Light Source Detection", Computers & Graphics 24, 2010, 10 pages.

Neverova, "Lighting Estimation in Indoor Environments from Low-Quality Images", Computer Vision—ECCV 2012—Workshops and Demonstrations, Oct. 2012, 10 pages.

Cakmakci, "A Compact Optical See-through Head-Worn Display with Occlusion Support", ISMAR '04 Proceedings of the 3rd IEEE/ACM International Symposium on Mixed and Augmented Reality, 2004, 10 pages.

Coltuc, "Very efficient implementation of max/min filters", Proceedings of the IEEE-EURASIP Workshop on Nonlinear Signal and Image Processing (NSIP'99), Jun. 20, 1999, 4 pages.

Hua, "Eyetracked optical see-through head-mounted display as an AAC device", Proc. SPIE 9117, Three-Dimensional Imaging, Visualization, and Display, Jun. 5, 2014, 7 pages.

Maimone, "Computational Augmented Reality Eyeglasses", Proc. IEEE Int'l Symp. Mixed and Augmented Reality (ISMAR 13), 2013, 10 pages.

Maimone, "Pinlight Displays: Wide Field of View Augmented Reality Eyeglasses using Defocused Point Light Sources", SIGGRAPH 2014, 2014, 11 pages.

Regan, "Priority Rendering with a Virtual Reality Address Recalculation Pipeline.", Computer Graphics (SIGGRAPH '94 Proceedings), 1994, 8 pages.

"Combined Search and Examination Report", GB Application No. 1619550.5, dated Apr. 24, 2017, 6 pages.

"Pre-Interview Communication", U.S. Appl. No. 15/675,045, dated Apr. 2, 2018, 3 pages.

"First Action Interview Office Action", U.S. Appl. No. 15/675,045, dated Jun. 14, 2018, 4 pages.

\* cited by examiner

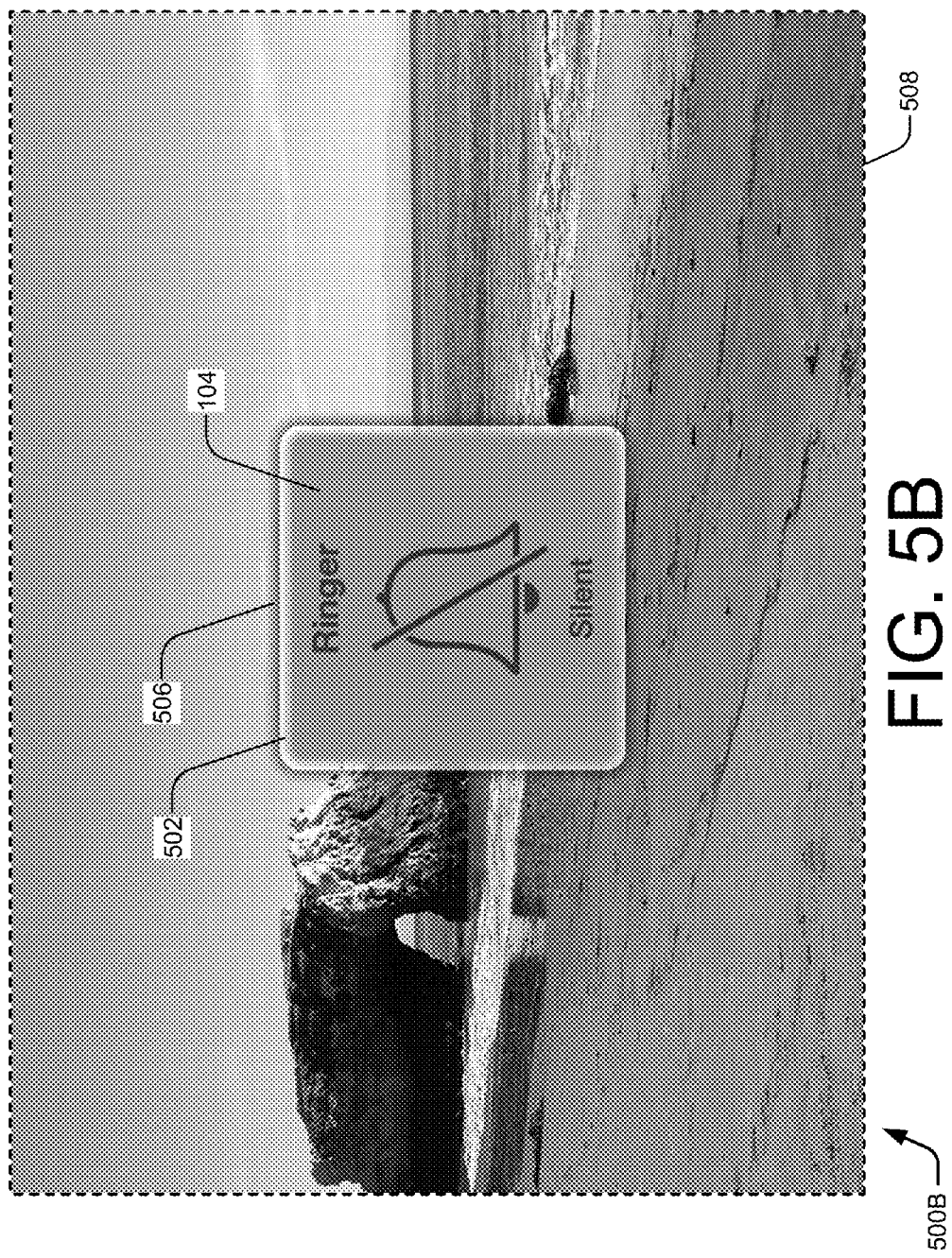

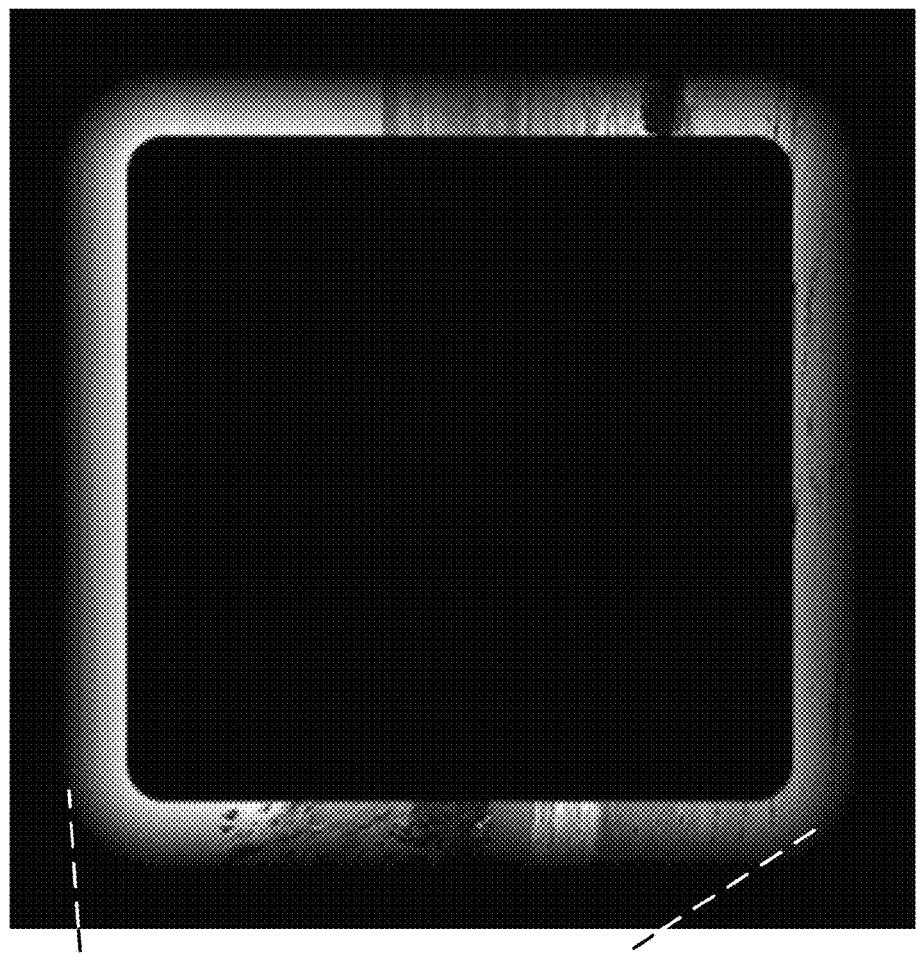
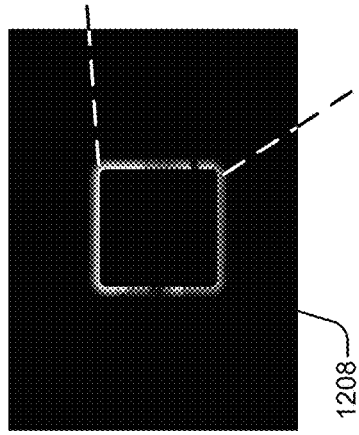
FIG. 12B

IMAGE COMPENSATION FOR AN OCCLUDING DIRECT-VIEW AUGMENTED REALITY SYSTEM

BACKGROUND

Augmented reality holds great promise for providing information relevant to a person's current environment. With augmented reality, visual images are added to a scene of an environment currently being viewed by a person. The visual images are synthetic graphical images (also referred to as "synthetic graphics" hereinafter) that are generated by a computer and added to a real-world scene. For example, a synthetic graphic may be overlaid or superimposed in front of the real-world scene. A synthetic graphic may also be inserted into the real-world scene such that the inserted visual image of the synthetic graphic appears to be partially behind a real-world object at some depth in the field of vision. With a finely-orchestrated insertion of a synthetic graphic, the synthetic graphic can appear to be integrated with the real-world scene, which can provide increased realism or enable annotations that do not block important visual aspects but still clearly indicate what visible object is being annotated.

A synthetic graphic may be helpful, humorous, entertaining, and so forth. For example, an augmented reality system can display directional arrows and textual instructions over streets or down hallways to help a person navigate to a requested destination. In another example, recommended tolerances or detailed installation instructions for an automotive part are displayed to help a car mechanic In yet another example, an augmented reality system can project the results of a planned structural remodel or the introduction of new furniture into a real-world view of an interior of a building. A synthetic graphic can further be used for amusement, such as displaying amusing comments or recent social media communications, for example, over the heads of friends and coworkers. In another example, an electronic "buddy" can be introduced into the surrounding space of a child to act as a playmate, tutor, or guide. Thus, augmented reality has the potential to positively impact many areas of life by enabling the addition of synthetic graphics into real-world scenes.

An augmented reality system may be configured in a variety of ways. For example, the augmented reality system may be configured as glasses to be disposed in front of a user's eyes, goggles that cover the eyes, another type of head-mounted display, a display screen, a video projector, or some combination thereof. These systems also include functionality to generate the synthetic graphic for visual presentation in conjunction with the real-world scene.

Augmented reality systems are typically built as one of two main types: see-through systems supporting a direct-view or camera-mediated systems supporting an indirect view. With systems of the former type, a person looks through a display screen presenting a synthetic graphic and also may directly view the real-world scene disposed behind the display screen. With systems of the latter type, a person looks at a display screen to see both the synthetic graphic and the real-world scene as jointly presented on the display screen. With both types of augmented reality systems, some approach is instituted to composite a synthetic graphic with the real-world scene to create a composited view. Unfortunately, a number of technological hurdles prevent the attainment of the full potential of augmented reality with either the direct-view approach or the camera-mediated approach.

With a camera-mediated augmented reality system, a person's view is conventionally constrained to a single-layered display screen presenting the world as captured through the use of a camera, but the display screen is physically opaque to the real-world from the perspective of the eye of the person viewing the display screen. In other words, the person's view is indirect because the person does not receive light originating from the real-world. Instead, a camera with an image sensor is exposed to the real-world scene, and one or two miniature display screens display the real-world scene by piping in data from an image sensor of the camera. A camera-mediated augmented reality system is analogous to looking through the viewfinder of a modern camcorder in which a liquid crystal display (LCD) screen presents a view of what the image sensor of the camcorder is currently "seeing" while lighting or focus indications are superimposed over the scene being recorded.

Accordingly, camera-mediated augmented reality systems allow for accurate compositing because the combining of the real-world scene and the synthetic graphics is performed electronically and then displayed together on a single-layered display screen. Unfortunately, camera-mediated systems degrade a person's view of the real-world environment due to resolution and latency constraints of the camera, image processing components, and limitations of the display screen, itself. A camera-mediated augmented reality system also becomes dark and completely opaque if the system experiences a power failure.

In contrast, with a direct-view augmented reality system, a person's eyes are exposed to light rays originating from real-world objects. A direct-view system includes a display screen having one or more display layers configured for insertion between the person's eyes and a real-world scene as directly viewed. An example of a display layer for a display screen that is at least partially see-through is an emissive display layer. An emissive display layer can be primarily transparent to the light originating from real-world objects, but the emissive display layer can also selectively present images that are sufficiently opaque so as to be discernable to the human eye. Thus, direct-view augmented reality systems use advanced optics incorporated into one or more display layers to create the illusion of a transparent display at a fixed distance in front of the viewer as superimposed over a real-world scene. Because real-world objects are viewed directly, the real world is seen with minimal latency.

Unfortunately, direct-view augmented reality systems also suffer from a number of drawbacks, such as a narrow field of view. Furthermore, the synthetic graphics added to a real-world scene are subject to the resolution constraints of a display sub-system, which can include multiple display layers of a display screen along with associated processing capabilities. Additionally, once synthetic graphics are superimposed by a direct-view augmented reality system, a person's ability to properly focus on the synthetic graphics can be compromised by anatomical characteristics of the human eye. For example, presenting a synthetic graphic in a manner to cause the eye and the mind to locate the synthetic graphic at a desired depth in the real-world view is difficult. This is especially so when the eye and the mind of a person are trying to combine light originating approximately an inch from the eye with light originating from real-world objects that are tens, hundreds, or more feet away from the person.

To facilitate accurate compositing of close-up synthetic graphics and far-away real-world objects, a freeform optics prismatic lens can be used as a display layer of a display screen in a direct-view augmented reality system. A freeform optics prismatic lens presents synthetic graphics with proper focus cues to help a person see the displayed synthetic graphics without blurriness and at the intended depth in the field of view. Integrated light-weight eye tracking can be employed to estimate where or on what object a person's eyes are currently focusing to determine a focal depth.

A challenging problem, however, remains with the introduction of occlusive synthetic graphics to direct-view augmented reality systems. A synthetic graphic added to a real-world scene occludes a person's view of one or more real-world objects. Although the occluding synthetic graphic blocks the view of some real-world objects, the occluding synthetic graphic is nevertheless desirable because the graphic provides information to the person, such as a description or other annotation of an object in the real-world scene. On the other hand, distracting image artifacts are undesirable. Direct-view augmented reality systems continue to be problematic because such systems produce distracting image artifacts in conjunction with the presentation of occluding synthetic graphics. An example of an image artifact is a dark halo around a displayed synthetic graphic. Such image artifacts result from multiple see-through display layers, the light originating from the real-world scene, or the interaction of multiple layers and incoming light.

One relatively simple approach, at least from an optical perspective, for introducing occlusive synthetic graphics into a real-world scene utilizes a conventional stack of LCD layers. The stack of LCD layers can both attenuate the real world and provide synthetic graphics in the foreground along with proper focus cues. Unfortunately, such devices have low spatial resolution and require computationally expensive optimization processing to display the synthetic graphics. Moreover, for the stacked LCD layers to gain angular resolution, the resolution of the LCD layers is increased. But LCD layers of sufficiently high resolution can blur the transmitted view of the real world due to diffraction effects. Employing three such LCD layers that are stacked on top of each other further exacerbates this problem. Additionally, if a conventional stack of LCD layers is used to attenuate the view of a person's surroundings to support viewing a synthetic graphic, a dark halo is visible around the synthetic graphic. Alternative optical systems have been proposed, but the alternative optical systems are both bulky and complex. The alternatives also compromise other desirable aspects of an augmented reality system, such as good contrast.

SUMMARY

Image compensation for an occluding direct-view augmented reality system is described. An augmented reality apparatus includes a display screen having two display layers that are selectively transparent. When the two display layers are both transparent, a user can see through the two layers to directly view a real-world scene. When one or both of the layers is displaying a synthetic graphic, however, the displayed graphic occludes at least part of the user's view of the real-world scene, and these occlusions can produce undesirable image artifacts. Two types of distracting, undesirable image artifacts are unintended light regions and unintended dark regions.

In one described aspect, a direct-view augmented reality apparatus compensates for an unintended light region. In another described aspect, a direct-view augmented reality apparatus compensates for an unintended dark region. With both described aspects, an augmented reality apparatus includes a display screen having an emissive display layer and an attenuation display layer to present synthetic graphics. In operation, the emissive display layer presents an emissive graphic displayed to an eye of the user and includes some informational content. The attenuation display layer is positioned between the emissive display layer and the real-world scene and presents an attenuation graphic that attenuates (e.g., substantially blocks) light originating from the real-world scene. The emissive graphic or the attenuation graphic may be prepared or presented using intensity maps or mattes indicative of areas of the emissive display layer or the attenuation display layer, respectively, that are to be activated instead of being transparent to light.

An unintended light region is visible if light originating from the real-world scene washes out (e.g., appears to fade) at least part of an emissive graphic being presented by the emissive display layer. For instance, an inner light halo at a border of the emissive graphic can develop depending on a size of a corresponding attenuation graphic that is responsible for blocking incoming light. To compensate for the unintended light region, a light region compensation module dilates the attenuation graphic to expand a size of the attenuation graphic. In operation, the light region compensation module dilates the attenuation graphic based on an attribute of an eye of the user, such as a radius of the pupil of the eye. A convolutional filter can be tuned using the eye attribute and applied to produce the expanded attenuation graphic. The augmented reality apparatus displays the expanded attenuation graphic behind the emissive graphic from the perspective of the user. The display of the expanded attenuation graphic compensates for the unintended light region that would otherwise be visible to the user.

An unintended dark region is visible if an attenuation graphic blocks too much light, such as in an area that is not covered by a corresponding emissive graphic from the perspective of an eye of the user. For instance, an outer dark halo at a border of the emissive graphic can develop if a corresponding attenuation graphic extends beyond the emissive graphic. To compensate for the unintended dark region, a dark region compensation module brightens the dark region using the emissive display layer. In operation, the dark region compensation module uses a camera to obtain data representative of light originating from the real-world scene. This light data is used to create a replica graphic that reproduces an appearance of the real-world scene for the unintended dark region. Further, the creation of the replica graphic can be fine-tuned by defocusing an attenuation matte for the expanded attenuation graphic to account for lens blur resulting from the attenuation graphic being out-of-focus to the eye of the user. The augmented reality apparatus uses the emissive display layer to present the replica graphic in a region bordering an edge of the emissive graphic where the expanded attenuation graphic extends beyond an edge of the emissive graphic. The display of the replica graphic compensates for the unintended dark region by reproducing an appearance of the real-world scene in an area of the unintended dark region that would otherwise be visible to the user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures.

FIGS. 5A and 5B illustrates a second visual compositing problem that results from a straightforward implementation of an attenuation display layer.

FIGS. 12A and 12B illustrate example aspects for generating a replica graphic using a replica mask and light detected by a camera.

DETAILED DESCRIPTION

Overview

Figure 1:
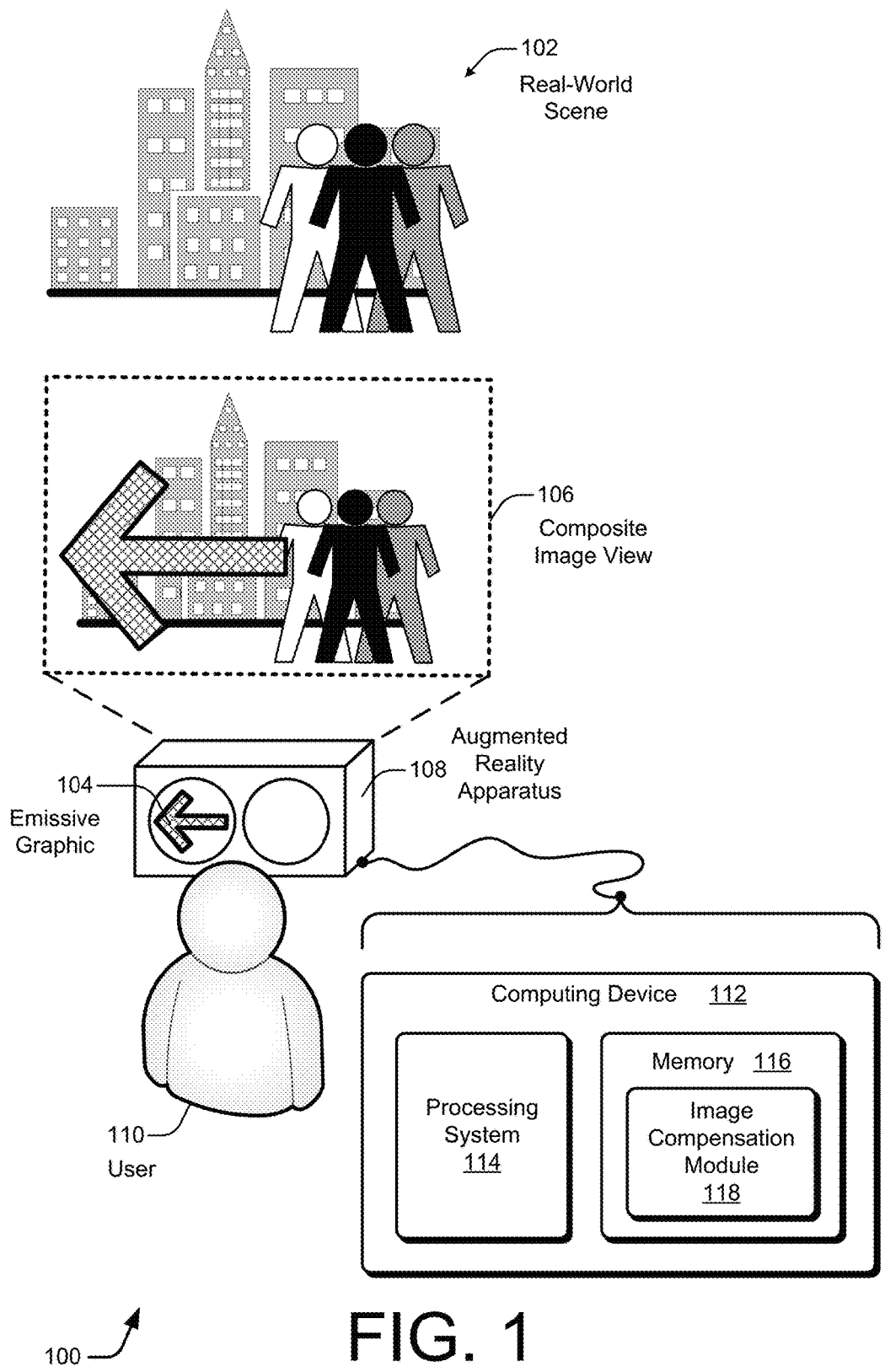
FIG. 1 illustrates an environment for example embodiments that are operable to implement image compensation for an occluding direct-view augmented reality system.

Compared to augmented reality systems that rely on camera-mediated indirect viewing, direct-view augmented reality systems have a lower latency and offer a more authentic interaction with the real-world, as well as a more natural viewing experience of the real-world. Unfortunately, implementation of a direct-view augmented reality system presents a different set of challenges. For example, displaying synthetic graphics in a manner that enables the eye and the mind to interpret the synthetic content at an intended depth of the real-world view is difficult. This is especially so because the eye and the mind try to focus on and combine light rays that originate from many meters away from the eye with light rays that originate from just millimeters away. These distances are orders of magnitude different from each other, and the different distances make the creation of a relatively seamless, non-blurry composite view problematic. Further, light rays from real-world objects can interact with the light rays of the synthetic graphics, and vice versa, in manners that interfere with a user's ability to properly see either one because image artifacts are created. For instance, regions that are darker or lighter than desired or intended may be visually apparent to a user in an image view that composites the synthetic graphics with the real-world objects.

Disclosed herein is a technology for a direct-view augmented reality system that provides image compensation for a viewing user. The direct-view augmented reality system includes an emissive display layer and an attenuation display layer that are placed between a user's eyes and a real-world scene. The technology advantageously compensates for undesirable image artifacts that result from interaction among the user's eyes, real-world objects, and the display layers of a direct-view augmented reality system. In existing systems, undesirable image artifacts are addressed using three or more stacked LCD layers, which are computationally expensive to operate and more likely to blur the transmitted view of the real-world scene due to diffraction effects. Here, the technology can compensate for undesirable image artifacts using fewer than three LCD layers by adjusting what is displayed on each layer.

Generally, instead of employing three or more stacked LCD layers, a display screen for an augmented reality system can use a single display layer, such as an emissive display layer. If a display screen with just an emissive display layer is utilized, however, a bright background of a real-world scene can wash out the appearance of a synthetic graphic being presented by the emissive display layer. To address the washing-out effect, an attenuation display layer is included as a second layer between the emissive display layer and the real-world scene. The emissive display layer presents an emissive graphic, such as an alert indicator or an instructional symbol, to add information to the real-world scene. The attenuation display layer presents an out-of-focus occluding graphic (referred to as an "attenuation graphic" herein) behind the emissive graphic to prevent light from the real-world scene from washing out the emissive graphic. Unfortunately, the resulting combination of the emissive graphic and a same-sized attenuation graphic can develop image artifacts as seen by an eye of a user. For example, the combination renders an unintended light region and an unintended dark region visible to the user. An inner light halo and an outer dark halo, for instance, appear around a border area of the emissive graphic.

To address the visual effects of image artifacts resulting from the introduction of an occluding synthetic graphic to a direct-view augmented reality display, apparatuses and techniques are described to compensate for such image artifacts. Use of the augmented reality apparatus disclosed here, which includes a display screen having two display layers and one or more associated techniques, advantageously ameliorates the appearance of undesirable light regions or undesirable dark regions. In example implementations, an out-of-focus, occluding attenuation graphic supports the viewing of an emissive graphic being added to a real-world scene. The out-of-focus attenuation graphic can be implemented at a relatively low resolution, and this lower resolution advantageously reduces the diffraction effects that can otherwise result in a blurring of the direct view of the real world being seen through the transparent display layers.

In some embodiments, the disclosed technology includes an image compensation module that employs techniques to ameliorate regions with undesirable lighting levels. The image compensation module includes a light region compensation module or a dark region compensation module. The light region compensation module and the dark region compensation module can be used separately or synergistically together. Generally, the light region compensation module modifies a transparency matte used for an attenuation display layer to prevent unwanted light from passing through the display. This modification is achieved with a calculation taking into account the pupil diameter of the user. The dark region compensation module prevents the background from appearing too dark by adding to the foreground sufficient light to compensate for the attenuated background. This involves use of a forward-facing camera to estimate the light arriving from the background. The resulting camera-based foreground image, which is termed a replica graphic herein, is presented along with the emissive graphic in an emissive display layer to compensate for the undesirable dark region. The majority of the background, however, is still directly viewed by the user.

More specifically, to compensate for an unintended light region, the light region compensation module dilates (e.g., expands) the attenuation graphic so as to extend beyond an edge of the emissive graphic. To determine how far to extend a boundary of the attenuation graphic beyond the edge of the emissive graphic, a value indicative of an attribute of the eye of the user is employed. For example, a radius of the pupil of the eye is used to tune a filter that establishes a size of the expanded attenuation graphic. Due to the natural focusing properties of the eye, along with the relative positioning of the emissive and attenuation display layers, the expanded attenuation graphic appears to be out-of-focus. The expanded attenuation graphic nevertheless attenuates more light from around the border of the emissive graphic as compared to the non-expanded attenuation graphic. Consequently, an unintended light region (e.g., an inner light halo) is compensated for in these manners by appreciably reducing the visibility of the undesirable light region. An appearance of an undesirable dark region (e.g., an outer dark halo), however, may become more pronounced.

To compensate for an unintended dark region, regardless of the cause, the dark region compensation module can cover the dark region with pixels that replicate at least a brightness level of the real-world scene in the vicinity of the dark region. If the dark region corresponds to an outer dark halo, there is a zone between the edge of the emissive graphic and a boundary of the attenuation graphic, which can be an expanded attenuation graphic. An outward facing camera detects light originating from the real-world scene at least in a vicinity corresponding to this zone. The dark region compensation module converts the detected light into pixels that replicate the appearance of the real-world scene in the unintended dark region to generate a replica graphic. The dark region compensation module adds the replica pixels of the replica graphic to those of the emissive graphic and presents both in the emissive display layer to camouflage the undesirable dark region. Thus, an unintended dark region (e.g., an outer dark halo) is compensated for in these manners by appreciably brightening the undesirable dark region based on an appearance of the real-world scene in the background.

In the following discussion, after some example terminology is set forth, an example environment is described that may employ the techniques described herein. Example embodiment systems, apparatuses, and techniques are then described, followed by a section explaining example embodiment procedures and processes. The procedures and processes may be performed in the example environment and systems as well as in other environments. However, performance of the example procedures is not limited to the example environment, and the example environment and systems are not limited to performance of the example procedures.

The drawings, particularly FIGS. 1-14, include a mixture of both schematic diagrams and simulated images. The schematic diagrams and simulated images are intended to illustrate aspects of embodiments so that relevant terminologies and principles can be clearly understood. The simulated images are further intended to represent visual examples of the results of applying the described principles. A comparison of schematic diagrams to simulated images may be made by looking at the schematic diagrams of FIG. 1 versus the simulated images of FIG. 2. FIGS. 2, 4A, 5A, and 14 include both a schematic diagram and a simulated image. FIG. 15 is directed to example procedures. FIGS. 16A-20 show additional simulated images to facilitate an understanding of the accuracy and error analysis section, which follows a description of the example procedures. A final section describes with reference to FIG. 21 an example computing device that can implement the described techniques.

Terminology Examples

Example descriptions or explanations of certain terms as used herein are set forth below. Each term is applicable to one or more, but not necessarily all, embodiments presented herein. Some terms are further elucidated using one or more examples.

A "real-world scene" refers to a view of an actual environment in which a user is currently looking at in real-time or near real-time. Real-world scenes can be contrasted with computer-generated images. Examples of a real-world scene may include a party with friends, a football game, a mountain vista, a child's dance recital, and so forth. A real-world scene may be viewed directly or indirectly.

A "direct-view" of a real-world scene refers to a situation or environment in which a user's eyes receive light originating from (e.g., reflecting or emanating from) a real-world object. The light rays may, however, pass through one or more transparent, semi-transparent, or partially opaque layers, such as an LCD layer. A direct view can be contrasted with an indirect, or camera-mediated, view in which a person looks at a real-world scene using a display screen that is fed images from a camera sensor.

An "image artifact" refers to an unintended or undesirable aspect of a still or motion picture that is not a natural part of the picture. The image artifact is a discernable artificial aspect of a picture that can be introduced due to a lens, a recording mechanism, a reproduction technique, added synthetic graphics, human perception, some combination thereof, and so forth. Examples of image artifacts may include an unintended light region, an unintended dark region, a lens flare, a blurriness, pixilation, or a combination thereof.

An "unintended light region" refers to an area of an image that is brighter than is intended or than is desired. A visually-apparent light region that is not designed to be there, has no purpose, or is not accurately indicative of a lighter area of a real-world scene may be unintended. For example, if an area of an image is brighter than another area of the image, but corresponding real-world areas do not likewise differ in brightness, the brighter area of the image may be an unintended light region. An area that is so bright that the area appears washed out or is difficult to see clearly may be an unintended light region.

An "unintended dark region" refers to an area of an image that is darker than is intended or than is desired. A visually-apparent dark region that is not designed to be there, has no purpose, or is not accurately indicative of a darker area of a real-world scene may be unintended. For example, if an area of an image is darker than another area of the image, but corresponding real-world areas do not likewise differ in darkness, the darker area of the image may be an unintended dark region. An area that is so dark that the area appears black, dark grey, shadowed, or is difficult to see the details of may be an unintended dark region.

An "emissive display layer" refers to a layer of an augmented reality apparatus capable of presenting an emissive graphic to an eye of a user. Amongst two or more layers, an emissive display layer may be positioned closest to the eye of the user. With a direct-view augmented reality apparatus, the emissive display layer is transparent to incoming light originating from a real-world scene. An emissive display layer is adapted to emanate light or coloration from multiple pixel locations to form patterns, shapes, or objects in the form of one or more emissive graphics that are recognizable to a user. The emanated light may be colored.

An "attenuation display layer" refers to a layer of an augmented reality apparatus that is capable of presenting an attenuation graphic to block light of a real-world object from an emissive graphic. Amongst two or more layers, an attenuation display layer is positioned between an emissive display layer and a real-world scene. With a direct-view augmented reality apparatus, the attenuation display layer can be transparent to incoming light originating from a real-world scene or can become substantially opaque at different times or in different areas. An attenuation display layer is adapted to make multiple pixel locations substantially opaque to support the viewing of an emissive graphic by blocking light that might otherwise wash out the emissive graphic due to formation of an unintended light region. If an attenuation display layer forms an opaque area that is not behind active pixels of an emissive graphic, the opaque area can result in an unintended dark region.

A "synthetic graphical image" or "synthetic graphic" refers to a visibly discernable diagram, picture, icon, etc. that is computer-generated. A synthetic graphical image can be computer-created by being formed from vectors, bitmaps, textures, three-dimensional meshes, etc. Additionally or alternatively, a synthetic graphical image can be processed, modified, or stored by a computer and applied in conjunction with other images. Examples of synthetic graphical images may include an emissive graphic, an attenuation graphic, a replica graphic, or a combination thereof.

An "emissive graphic" refers to a computer-generated diagram, picture, icon, etc. that is presented at or by an emissive display layer. Examples of an emissive graphic may include a notification or alert indicator, navigational directions or icons, textual comments or instructions, an animated character, information from a social media feed, or combinations thereof. An emissive graphic can be still or in motion. An emissive graphic may be referred to herein as a foreground graphic because the emissive graphic is displayed physically in the foreground as compared to the real-world scene which serves as the background. However, an emissive graphic may be rendered such that the graphic is merged or integrated with the background, for instance, by appearing to be located partially behind an object of the real-world scene. An emissive graphic may be washed out or rendered unintentionally too bright by background lighting if the emissive graphic is not supported by an attenuation graphic blocking the background lighting.

An "attenuation graphic" refers to a pattern or shape presented at or by an attenuation display layer. An attenuation graphic can be associated with an emissive graphic that the attenuation graphic is designed to support. For example, an attenuation graphic can be formed to have a substantially similar size and shape as an associated emissive graphic. The attenuation graphic is substantially opaque such that light originating from a real-world object that is blocked by the attenuation graphic can prevent an unintended light region from forming over at least part of an associated emissive graphic.

A "replica graphic" refers to a graphic presented at or by an emissive display layer. A replica graphic is generated to reproduce an appearance of a real-world scene. For example, a replica graphic can emulate a brightness level or a coloration in a particular image region. A replica graphic can be used to camouflage an unintended dark region. Data to assign values to pixels of a replica graphic can be obtained from a camera pointed at the real-world scene.

A "camera" refers to a device or component that includes a sensor capable of detecting light. The light sensor can convert detected light into data representative of an appearance of the source or origination of the light, such as a real-world scene. An "appearance of a real-world scene" refers to how a real-world scene looks visually. The appearance of a region of a real-world scene can pertain to a brightness level generally or to coloration details for specific pixels or pixel groups, either of which can be used to camouflage an unintended dark region.

An "attribute of the eye" refers to some aspect of the eye of a user of an augmented reality apparatus. The attribute can capture a changing quantity or aspect over time, can include a momentary snapshot of a changing quantity, can include a constant characteristic, and so forth. Examples may include a value indicative of a size of an eye, a direction of gaze or movement of the eye, or a focal depth of the eye.

A "value indicative of a size of an eye" refers to a determinable measurement of some aspect of the eye. For example, a value indicative of a size of the eye may pertain to the radius of a pupil of the eye, or equivalently the diameter thereof. A "direction of gaze or movement" refers to where, at what angle, or at what object an eye is looking at, tracking, or tracking towards. A "focal depth" refers to a distance or plane at which one or both eyes is rendering observable details clear, such as a person across a table or a mountain across a valley.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B").

Example Environment

FIG. 1 illustrates an environment 100 for example embodiments operable to employ techniques described herein that relate to image compensation for an occluding direct-view augmented reality system. As illustrated, the example environment 100 includes a real-world scene 102, an emissive graphic 104, and a composite image view 106. The environment 100 further includes an augmented reality apparatus 108, a user 110, and a computing device 112. The computing device 112 includes a processing system 114 and a memory 116. The memory 116 includes an image compensation module 118. Example implementations for the computing device 112 are described further in this section and further below with reference to FIG. 21.

In example embodiments, the augmented reality apparatus 108 is implemented as a see-through, direct-view augmented reality apparatus. The user 110 primarily sees the real-world scene 102 directly by receiving light that originates (e.g., emanates or reflects) from real-world objects. The augmented reality apparatus 108 is capable of adding at least one emissive graphic 104 to the real-world scene 102. The user's eyes and mind combine the real-world scene 102 and the emissive graphic 104 into the apparent composite image view 106.

The emissive graphic 104 is computer-generated synthetic content that provides information to the user 110. The emissive graphic 104 can include text, at least one character, at least one symbol, at least one design, at least one object, or some combination thereof. Although the emissive graphic 104 is computer-generated and synthetic relative to the current real-world scene 102, the emissive graphic 104 can include photographs, videos, or portions thereof of other real-world objects, in addition to content that is computer-created. In other words, in addition to computer-created images that are derived from vectors, three-dimensional wire meshes with textured skins, text fonts, etc., a displayed emissive graphic 104 can also include those images captured using a camera sensor. In parts of this description, for purposes of simplifying clarity, the real-world scene 102 is referred to as the background or background image, and the emissive graphic 104 is referred to as the foreground or foreground image. However, the described principles are also applicable to situations in which the emissive graphic 104 is inserted at some particular depth of the viewed scene, and therefore appears to be located in the background.

The computing device 112 may be implemented as any suitable type of computing device. The computing device 112 can be integrated with or separately from the viewing portion of the augmented reality apparatus 108. In some embodiments where there is separate integration, the augmented reality apparatus 108 and the computing device 112 may be communicatively coupled by wire or wirelessly. Further, the computing device 112 can be implemented as a local adjunct device, such as a mobile phone or game machine, or a remote adjunct device, such as an internet server or vehicle computer. Thus, implementations of the computing device 112 may range from relatively high-resource devices with substantial memory and processor resources (e.g., a mobile phone or remote server) to relatively low-resource devices with constrained memory or processing resources (e.g., a wearable augmented reality pair of glasses).

The computing device 112 is illustrated as including a variety of hardware components, examples of which include: a processing system 114, an example of a computer-readable storage medium illustrated as memory 116, and so forth. Other hardware components are also contemplated as further described herein below with reference to FIG. 21. The processing system 114 is representative of functionality to perform operations through execution of instructions stored in the memory 116. In example implementations, an image compensation module 118 is located at or executing on the computing device 112, such as by being part of a larger application (not shown), which may provide augmented reality functions to a user. The image compensation module 118 represents functionality to implement schemes and techniques for image compensation for an occluding direct-view augmented reality system as described herein. The image compensation module 118 may be implemented as at least part of a software package that executes on and specially configures one or more processors, which processors may physically realize the processing system 114; as a hardware apparatus, which may be realized as an application-specific integrated circuit (ASIC) or as the computing device 112; or using a combination of software, hardware, firmware, or fixed logic circuitry; with some combination thereof; and so forth. Examples of hardware and associated logic are described herein with particular reference to FIG. 21.

Figure 2:
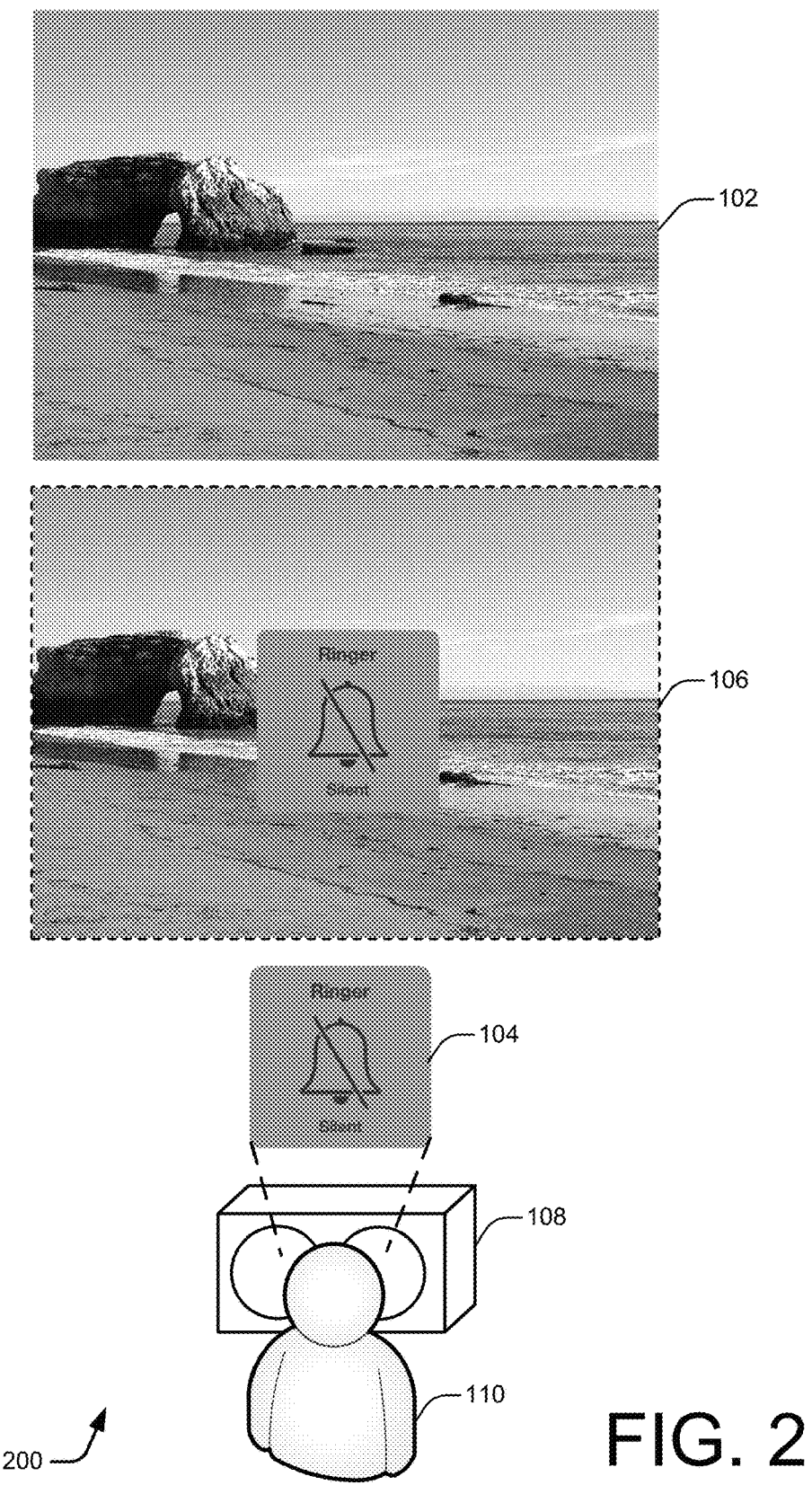
FIG. 2 depicts an example of simulated images of a real-world scene and an occluding synthetic graphic that are composited into a compensated image view.

FIG. 2 depicts generally at 200 an example of simulated images of a real-world scene 102 and an occluding synthetic graphic that are composited into a compensated image view 106. The pictures of FIG. 1 are illustrated as schematic diagrams. In contrast, the pictures of FIG. 2 are illustrated as simulated images. The user 110 is looking through an augmented reality apparatus 108 at the real-world scene 102 that has an emissive graphic 104 added thereto so as to produce the composite image view 106. The composite image view 106 of FIG. 2 represents a compensated image view that does not appear to have an unintended light region or an unintended dark region. The example real-world scene 102 for the simulated images is a beach scene with sand, the ocean, and an interesting rock formation. The example emissive graphic 104 for the simulated images is a ringer status icon, such as one produced by an iPhone® from Apple Inc. of Cupertino, Calif.

Systems and Techniques

This section describes some example details of systems and techniques for image compensation for an occluding direct-view augmented reality system in accordance with one or more embodiments.

Figure 3:
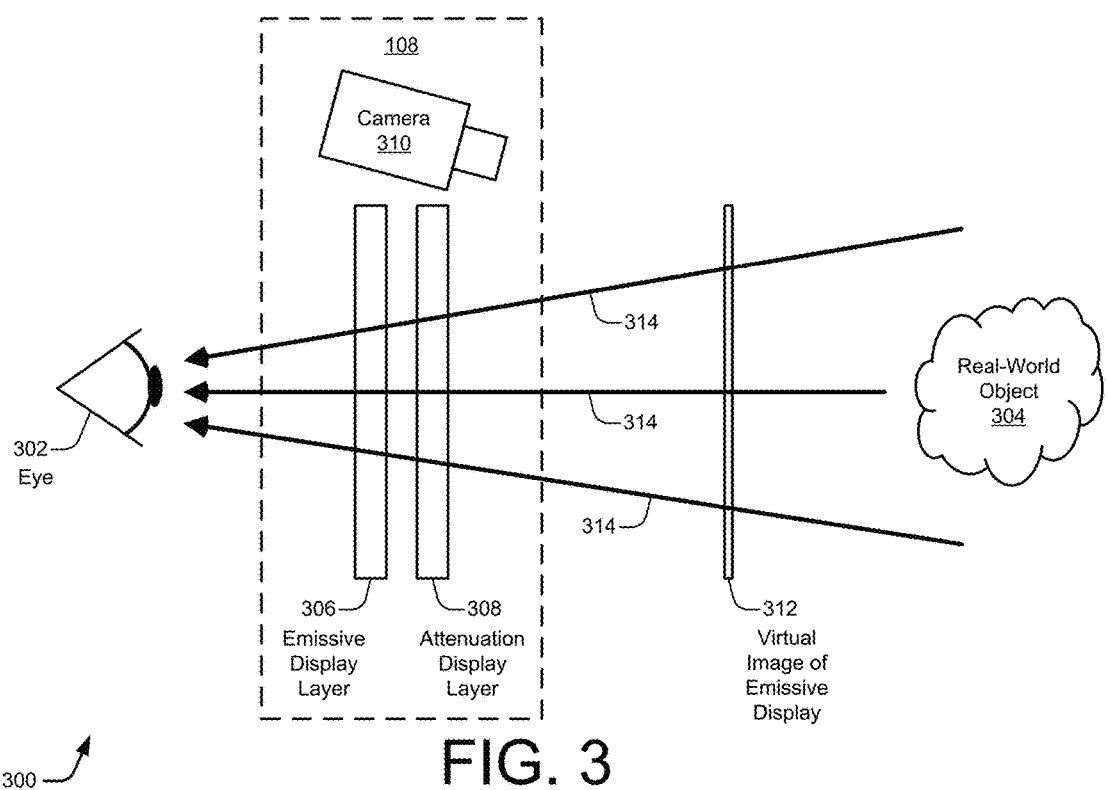
FIG. 3 illustrates an example of an augmented reality apparatus with a see-through emissive display layer and an attenuation display layer.

FIG. 3 illustrates an environment 300 having an example augmented reality apparatus 108 that includes a see-through emissive display layer 306 and an attenuation display layer 308. The environment 300 further includes an eye 302 of a user (not shown) and a real-world object 304 of a real-world scene 102 (of FIG. 1). The augmented reality apparatus 108 is positioned between the eye 302 and the real-world object 304. The emissive display layer 306 is positioned between the eye 302 and the attenuation display layer 308. The attenuation display layer 308 is positioned between the emissive display layer 306 and the real-world object 304.

Multiple light rays 314 are also shown in FIG. 3. The multiple light rays 314 originate from (e.g., emanate or reflect from) the real-world object 304. The light rays 314 pass through transparent portions of the emissive display layer 306 and the attenuation display layer 308 to be detected by the eye 302. In areas that are not currently displaying a graphic, the emissive display layer 306 and the attenuation display layer 308 can be rendered transparent to the light rays 314. Such transparent portions are indicated by the intensity map and attenuation mattes illustrated in FIG. 7 et seq. To the eye 302, a graphic present on the emissive display layer 306 would appear to to be located at some distance from the user as a virtual image 312 of the emissive display.

In example embodiments, the attenuation display layer 308 has a lower resolution than the emissive display layer 306. Although the display from the emissive display layer 306 is seen by the eye 302 at the remote focal distance as designed into the emissive display layer 306, the attenuation display layer 308 is seen out-of-focus due to the positioning of the attenuation display layer 308 behind the emissive display layer 306, in conjunction with the pupil diameter of the user's eye. If the attenuation display layer 308 is used to directly display the alpha-channel or matte for the emissive graphic 104, the resulting image formed on the retina of the observing user is attenuated by the attenuation display layer 308 that is out of focus, even while the view of the world is in focus. This can be experienced by holding a finger close to the eye while focusing on a far-away object in the distance. The edge of the occluding finger is seen to be blurred, but the far-away object that is in focus is crisp. This out-of-focus condition is described further below with reference to FIGS. 5A and 5B, and the condition can be ameliorated with techniques described with reference to FIGS. 9-12B.

The camera 310 is shown as being integrated with the augmented reality apparatus 108. However, the camera 310 may be separate from the augmented reality apparatus 108 and coupled thereto via wire or wirelessly. The camera 310 includes one or more sensors, such as a charge-coupled device (CCD) or a complementary metal-oxide-semiconductor (CMOS) image sensor. In operation, the camera 310 detects light rays 314 originating from the real-world object 304 and produces data representative of the light rays 314. As described below, the data can be used to compensate for an unintended dark region as seen from the perspective of the eye 302 due to an attenuation graphic presented at the attenuation display layer 308 and blocking the corresponding light rays 314 from the eye 302.

Figure 4A:
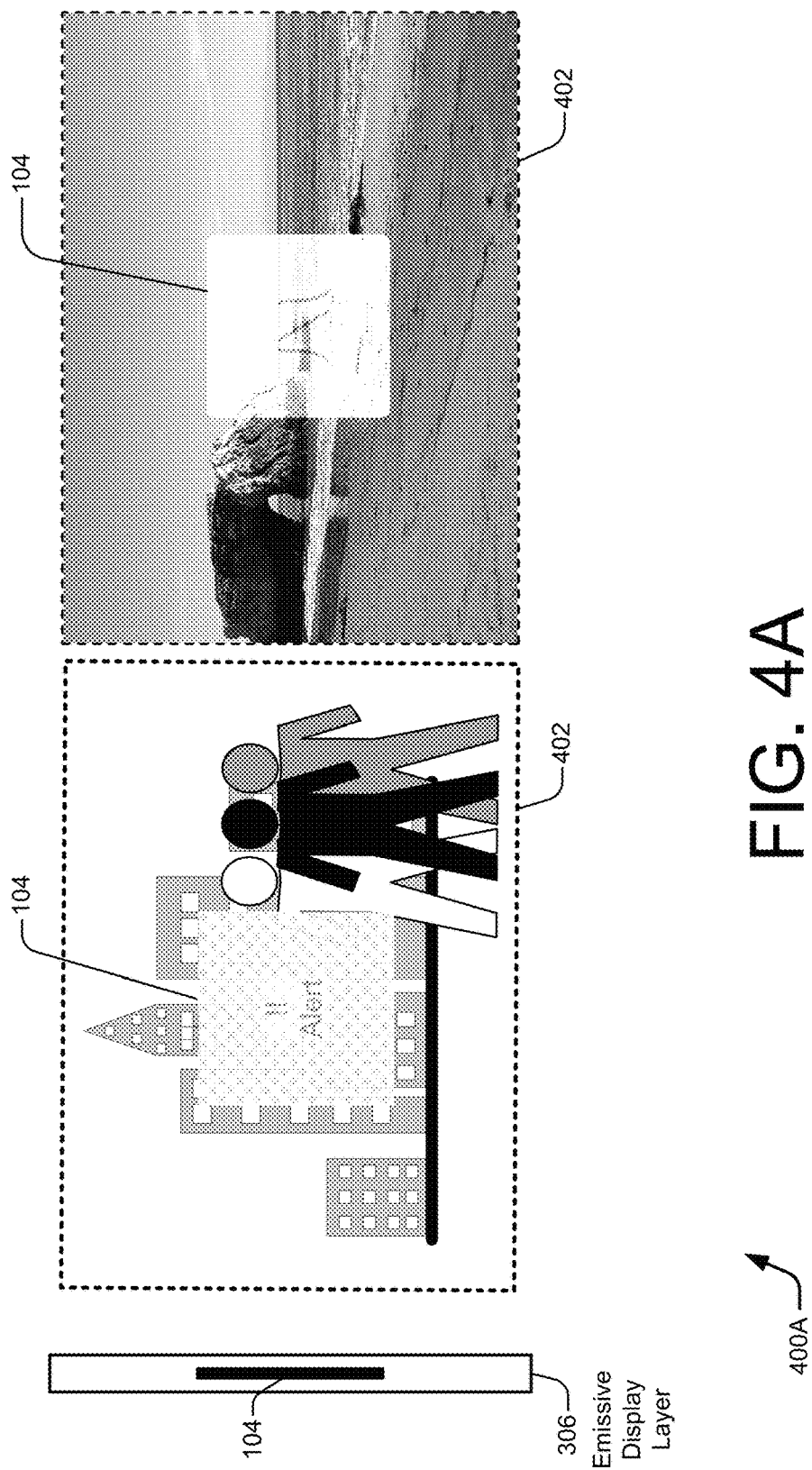
FIGS. 4A and 4B illustrate a first visual compositing problem that results if an emissive display layer is operated without an attenuation display layer.
Figure 4B:

FIGS. 4A and 4B illustrate generally at 400A and 400B, respectively, a first visual compositing problem. This first visual compositing problem results from an augmented reality apparatus operating with an emissive display layer 306 but without an attenuation display layer. Consequently, the emissive graphic 104 is washed out by background lighting from the real-world-scene. FIG. 4A depicts the emissive display layer 306 in a cut-away side view with the emissive graphic 104 being displayed therein. FIG. 4A also illustrates two example composite image views 402 that show an undesirable image artifact. Specifically, the emissive graphic 104 is shown as being overly-light and therefore difficult to see because the background lighting is washing out the emissive graphic 104. The example schematic composite image view 402 is on the left, and the example simulated composite image view 402 is on the right. FIG. 4B provides an enlarged view of the simulated composite image view 402. As shown in FIG. 4B, the washed-out appearance of the emissive graphic 104 is clearly apparent. Fortunately, the inclusion of an attenuation graphic in an attenuation display layer can reduce much of the washed-out appearance of the emissive graphic 104, as is shown in FIGS. 5A and 5B.

Figure 5A:
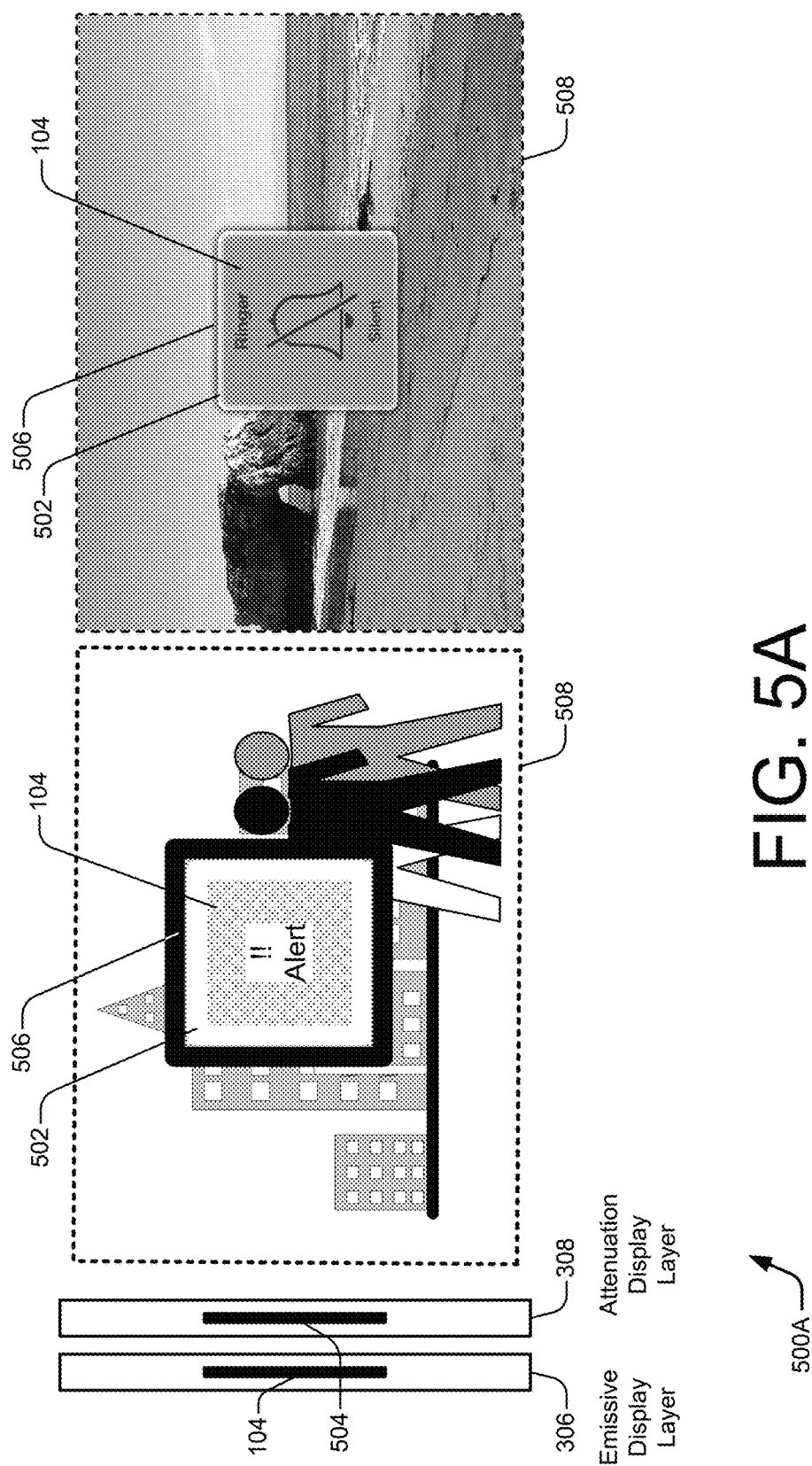

FIGS. 5A and 5B illustrate generally at 500A and 500B, respectively, a second visual compositing problem. This second visual compositing problem results from an augmented reality apparatus operating with a straightforward implementation of an emissive display layer 306 and an attenuation display layer 308. Such a situation produces an unintended light region 502 and an unintended dark region 506. These undesirable image artifacts are shown in two example composite image views 508. FIG. 5A also depicts the emissive display layer 306 and the attenuation display layer 308 in a cut-away side view. The emissive display layer 306 is displaying an emissive graphic 104, and the attenuation display layer 308 is displaying an attenuation graphic 504. In this straightforward implementation, the attenuation graphic 504 is displayed at the same size as the emissive graphic 104.

The attenuation graphic 504 does block much of the background lighting from the emissive graphic 104. This prevents the background lighting from completely washing out the emissive graphic 104, which is the condition shown in FIGS. 4A and 4B as the first visual compositing problem. Unfortunately, a second problem is created with the straightforward inclusion of the attenuation graphic 504. Specifically, regions with undesirable appearances, such as an unintended light region 502 and an unintended dark region 506, are produced as shown in FIGS. 5A and 5B. An example schematic composite image view 508 is shown on the left, and an example simulated composite image view 508 is shown on the right. FIG. 5B provides an enlarged view of the simulated composite image view 508. As shown in FIG. 5B, the unintended light and dark regions are clearly apparent. As illustrated, the unintended light region 502 and the unintended dark region 506 develop in the vicinity of the emissive graphic 104. For example, the unintended light region 502 manifests as an inner light halo, and the unintended dark region 506 manifests as an outer dark halo.

These two halos (which are examples of the regions 502 and 506) follow at least a portion of a border of the emissive graphic 104. The halos are image artifacts that result from the out-of-focus attenuation display layer 308. The inner edge of the emissive graphic 104 may appear too bright because the background is not completely obscured by the out-of-focus attenuation display layer 308. Furthermore, beyond the border of the emissive graphic 104, the background may appear too dark because the blurred attenuation layer is obscuring some of the background that should not be attenuated. Although certain implementations described herein address an unintended light region 502 or an unintended dark region 506 that is in the vicinity of an emissive graphic 104 or that is manifested as a halo thereof, the principles described herein are applicable to unintended light and dark regions having alternative causes, locations, or shapes.

Figure 6:
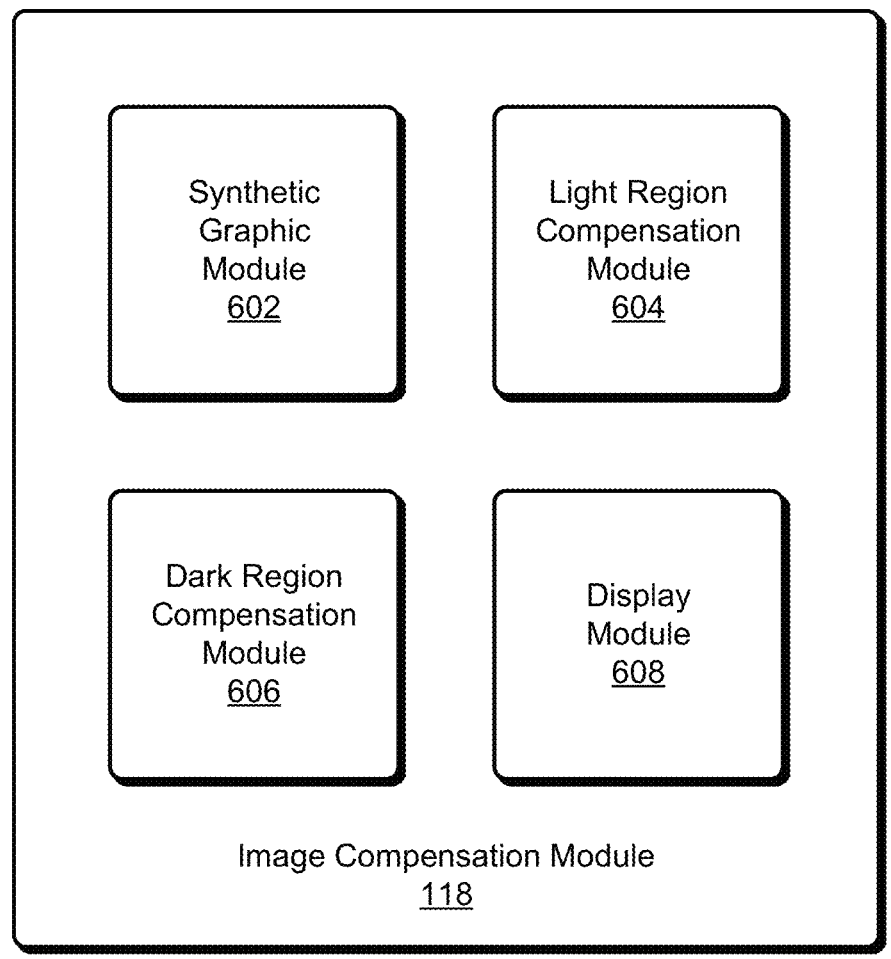
FIG. 6 illustrates an example of an image compensation module, including a light region compensation module and a dark region compensation module.
Figure 7:
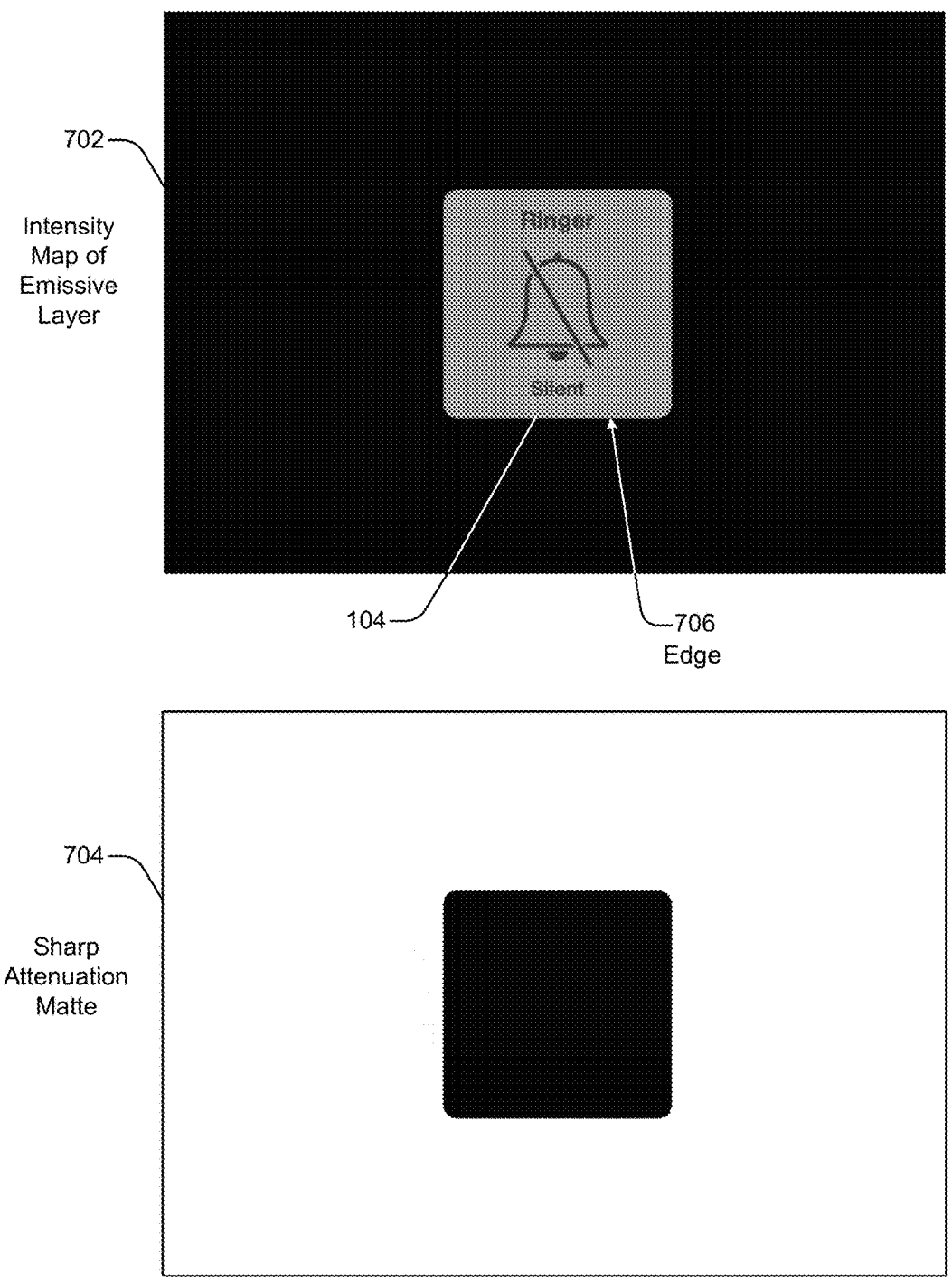
FIG. 7 illustrates example aspects for displaying an emissive graphic and an attenuation graphic.
Figure 8:
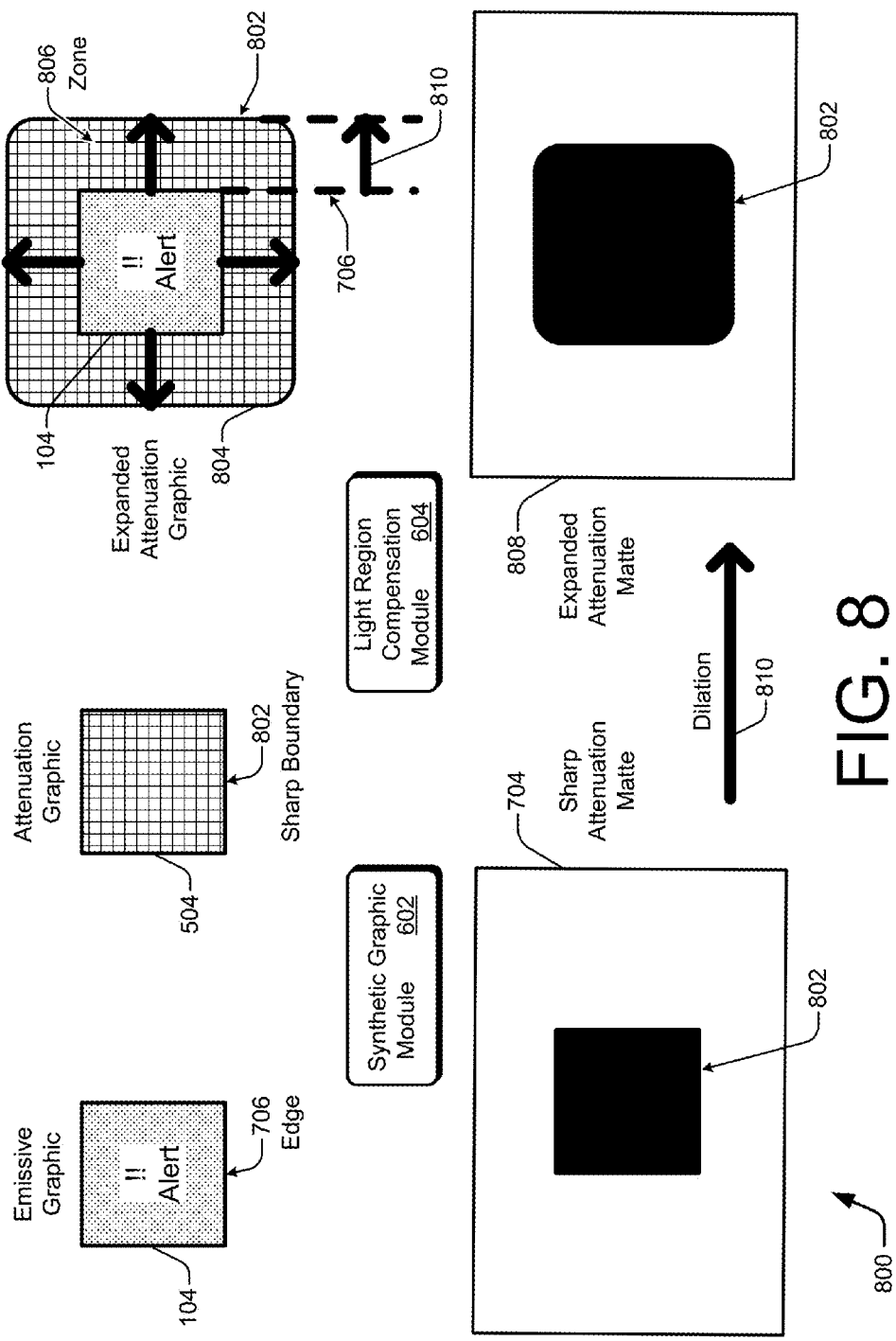
FIG. 8 schematically illustrates an example approach to dilating a sharp attenuation graphic to produce an expanded attenuation graphic.
Figure 9:
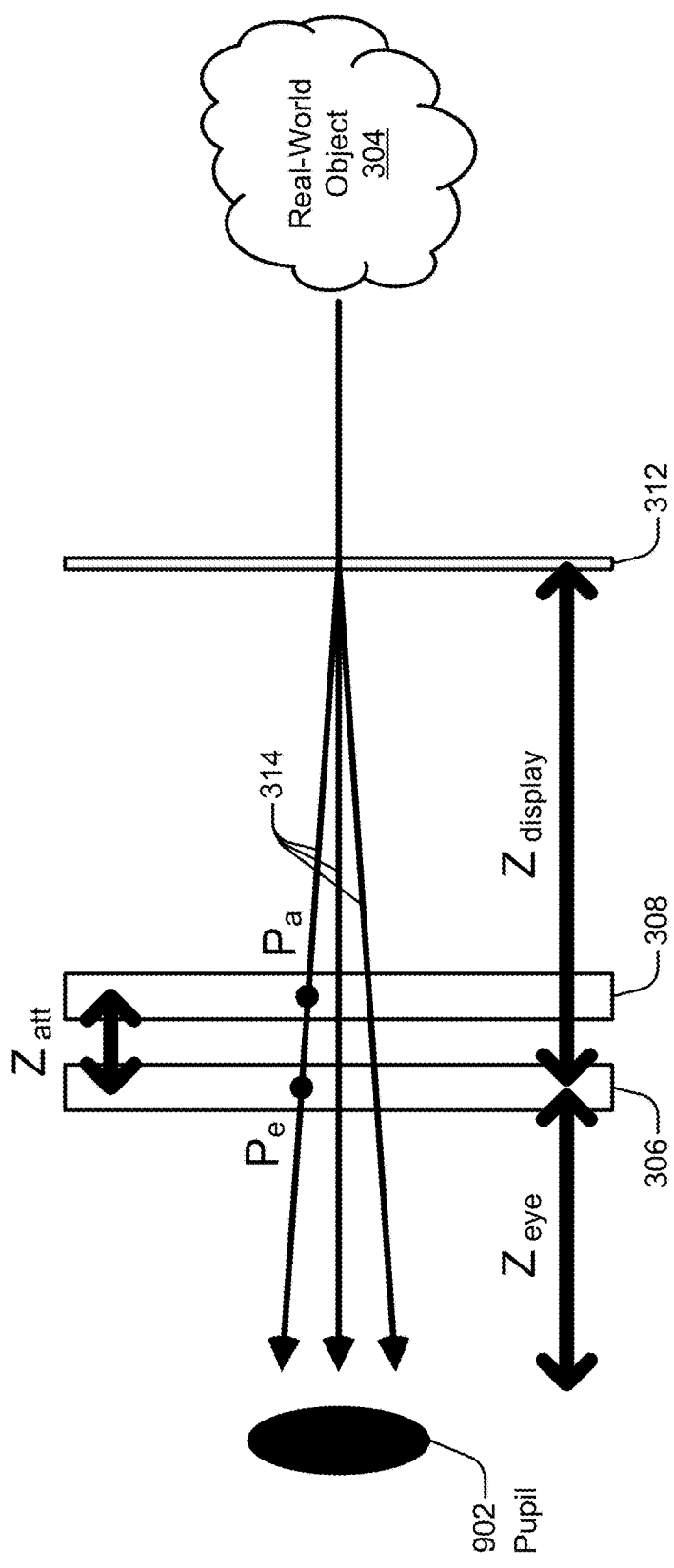
FIG. 9 illustrates an example of multiple physical characteristics related to using a radius of a pupil to determine a factor for dilating an attenuation graphic.

FIG. 6 illustrates an example of an image compensation module 118. The image compensation module 118 includes a synthetic graphic module 602, a light region compensation module 604, a dark region compensation module 606, and a display module 608. Any one or more of these modules can be implemented at least partially in hardware, such as with a processing system and computer-readable storage medium, which are described herein with reference to FIG. 21. In example embodiments, the synthetic graphic module 602 generates an emissive graphic 104 and an initial version of an attenuation graphic 504 based on the emissive graphic 104. The light region compensation module 604 compensates for an unintended light region 502 by dilating the initial version of the attenuation graphic 504 to produce an expanded attenuation graphic 804 (of FIG. 8). The dilation is based on an attribute of the eye of the user, such as a radius of the pupil of the eye. FIGS. 7-9 are directed to implementations of the synthetic graphic module 602 and the light region compensation module 604.

The dark region compensation module 606 compensates for an unintended dark region 506 by adding pixels to the emissive display layer 306 that replicate the light blocked by the attenuation display layer 308 but not covered by pixels displayed on the emissive display layer 306. For example, replicating pixels can be displayed that reproduce that light blocked by an expanded version of the attenuation graphic 504, or expanded attenuation graphic 804. The light reproduction can entail mimicking a brightness level or an appearance of the real-world scene 102. The out-of-focus nature of the attenuation graphic 504 or 804 can be handled by defocusing, or blurring, an attenuation matte corresponding to the attenuation graphic 504 or 804 prior to creating a replica matte that defines a zone in which replica pixels are generated. The display module 608 is capable of controlling the emissive display layer 306 and the attenuation display layer 308 such that the emissive graphic 104, the expanded attenuation graphic 804, and pixels of a replica graphic are properly displayed. FIGS. 10-13 are directed to implementations of the dark region compensation module 606 and the display module 608.

FIG. 7 illustrates generally at 700 example aspects for displaying an emissive graphic 104 and an attenuation graphic. An example of an intensity map 702 for the emissive layer is depicted in the top half of FIG. 7, and an example of a sharp attenuation matte 704 is depicted in the bottom half. The intensity map 702 is black or dark in locations in which no pixels are to be displayed or colored in the emissive display layer 306 (of FIG. 3). The synthetic graphic module 602 therefore makes the intensity map 702 black except for the location of an area of the graphic 104, which is colored in accordance with the intended emissive graphic 104. The sharp attenuation matte 704 corresponds to the intensity map 702 of the emissive layer and is associated with the emissive graphic 104 by being based on the size and shape of the emissive graphic 104.

The sharp attenuation matte 704, which serves as a transparency map, is white in regions in which light is to be transmitted from the background, is black in opaque regions in which no light is to be transmitted from the background, and is shades of grey for partially transparent regions. The white portions of the sharp attenuation matte 704 indicate portions that are to remain transparent to incoming light rays. The design of the attenuation characteristics of the foreground graphic may be supplied along with the design of the emissive intensity characteristics of the foreground graphic, or the design of the attenuation characteristics may be created automatically based on the emissive intensity characteristics of the foreground graphic. Both may be specified using arrays of image pixel values, or via a vector-based description such as would be produced by a drawing application. The exact design of the transparency and emissive layers is determined by the synthetic graphic module 602 used to create the graphic, and any combination of foreground intensity and background transparency can be implemented. At the top half of FIG. 7, an edge 706 of the emissive graphic 104 is indicated along with the intensity map 702 of the emissive layer. The edge 706 is also shown in FIG. 8.

FIG. 8 schematically illustrates an example approach 800 to dilating an attenuation graphic 504. The approach 800 includes the light region compensation module 604 performing a dilation 810. In the top left corner, the emissive graphic 104 is depicted as having the edge 706. The synthetic graphic module 602 uses a size of the emissive graphic 104 to establish a size for the attenuation graphic 504, which is depicted in the top middle of FIG. 8. For example, the sizes of the emissive graphic 104 and the attenuation graphic 504 can be substantially equal. In other words, to a degree feasible given the relative resolution capabilities of the emissive display layer 306 and the attenuation display layer 308, the attenuation graphic 504 can initially be made the same size as the emissive graphic 104. As used herein, the term "attenuation graphic" or "attenuation graphic 504" may refer at least to an initial version of an attenuation graphic—such as prior to the dilation 810, multiple versions of an attenuation graphic—such as before and after dilation 810, the general concept of an attenuation graphic, and so forth.

The synthetic graphic module 602 can form the attenuation graphic 504 or 804 on or using the attenuation display layer 308 in a manner that is substantially opaque to light rays. The attenuation graphic 504 or 804 may be formed using, for instance, a solid dark color such as black or gray. However, the schematic diagrams of the attenuation graphics 504 and 804 are depicted with a cross-hatched pattern to enable visual differentiation with the schematic diagram of the emissive graphic 104. A sharp boundary 802 of the attenuation graphic 504 and the expanded attenuation graphic 804 is indicated in the top middle portion of FIG. 8 and the top right corner of FIG. 8, respectively.

In example embodiments, the light region compensation module 604 dilates the attenuation graphic 504 so that the expanded attenuation graphic 804 blocks more background light from coming through the display layers in a vicinity around the edges 706 of the emissive graphic 104. The dilation 810 of the attenuation graphic is illustrated in the top right corner of FIG. 8. The light region compensation module 604 dilates (e.g., enlarges or expands) the attenuation graphic 504 by extending the boundary 802 beyond the edge 706 of the emissive graphic 104. The expanded attenuation graphic 804, in comparison to the emissive graphic 104, includes a zone 806 that is not coextensive with the smaller emissive graphic 104. This zone 806 is not necessarily depicted to scale in FIG. 8. Also, although the attenuation graphic 504 is shown being dilated equally in multiple different directions around the boundary 802 of the attenuation graphic 504, one or more sides or other portions of an attenuation graphic 504 may be dilated to a different degree, including not being dilated.

Two different versions of an attenuation matte for the attenuation display layer 308 is shown in the lower half of FIG. 8. The dark portion of the attenuation matte indicates what portion of the attenuation display layer 308 is to be activated so as to attenuate incoming light rays. The white portions of the attenuation matte indicate portions that are to remain transparent to incident light rays. The synthetic graphic module 602 creates the attenuation graphic 504 so as to have a sharp boundary 802. Although a displayed attenuation graphic 504 or 804 may seem out-of-focus to an eye of the user and therefore appear blurry, the light region compensation module 604 is operating on a sharp boundary 802. As shown by the schematic diagrams of the attenuation mattes in the lower half of FIG. 8, the dilation 810 may alternatively be accomplished by moving the boundary 802 corresponding to the attenuation graphic 504 in the sharp attenuation matte 704 so as to expand the attenuation graphic. Thus, the light region compensation module 604 can perform the dilation 810 on the sharp attenuation matte 704 to produce the expanded attenuation matte 808, which corresponds to the expanded attenuation graphic 804 that maintains a sharp boundary 802. The expanded attenuation graphic 804 may also be referred to herein as a dilated attenuation graphic, and the expanded attenuation matte 808 may also be referred to herein as a dilated attenuation matte.

Example operations for the light region compensation module 604 are described qualitatively above. Example operations for the light region compensation module 604 are presented below in quantitative terms with a more computationally rigorous description. To facilitate understanding by simplifying the mathematical description, the emissive display layer is referred to as the foreground, and the real-world scene is referred to as the background.

The foreground graphic has a spatially varying non-premultiplied intensity $I_F$, which corresponds to the emissive graphic 104, and a foreground transparency value $T_F$, which corresponds to the sharp attenuation matte 704. Given a background real-world intensity $I_B$, the composite color $I_C$ may be computed using Equation (1):

$$I_C = I_F \times (1 - T_F) + T_F \times I_B. \qquad (1)$$

For a case in which the user's eye is focused on the foreground graphic display depth, and the background is also at the same depth, then the effective transparency of the background attenuating element is computed as $T_B$, which results from the convolution of the attenuating pixels $t_B$ due to a size of the pupil using Equation (2):

$$T_B(x,y) = \sum_{i=x-k}^{x+k} \sum_{j=y-k}^{y+k} t_B(i,j) * W(i-x, j-x), \qquad (2)$$

where $W(i,j)$ is a kernel representing the convolution by the eye of the attenuation graphic, with a kernel radius $k$ expressed in the pixel coordinates of the attenuation display layer.

To compute $W(X,Y)$ in the coordinate system of the attenuation display layer, the real-world attenuation function corresponding to the physical aperture of the eye $E(X,Y)$ is projected onto the attenuation display layer and converted to pixel coordinates. One simplifying assumption is to consider the pupil to be round and the view direction to be orthogonal to the display, in which case $W(i,j)$ takes the form of a circular top-hat function with a value of 1 inside the radius of the circle and a value of 0 otherwise. Alternatively, for an off-orthogonal viewing direction, the pupil may be approximated using an ellipse. For an orthogonal viewing direction and a round pupil, however, the radius $R_{att}$ of the top-hat function in physical units depends on the pupil radius of the eye $R_{eye}$. More specifically, the radius $R_{att}$ depends on the pupil radius of the eye $R_{eye}$ as scaled by the ratio of the distances (i) between the eye and the virtual image and (ii) between the attenuating display and the virtual image. The radius $R_{att}$ of the top-hat function is computed from Equation (3):

$$R_{att} = R_{eye} * (Z_{display} - Z_{att}) / (Z_{display} + Z_{eye}). \qquad (3)$$

The variables for Equation (3) are described below: The size of a pupil of an eye (e.g., the pupil radius of the eye, $R_{eye}$) can be determined using a camera directed towards the eye, such as a camera that is also used for eye-tracking. With regard to the other three variables, FIG. 9 illustrates generally at 900 examples of multiple variables, namely P and Z. These variables are related to an augmented reality apparatus that uses a measurable characteristic of a pupil 902 to determine a factor for dilating an attenuation graphic. The variable $Z_{att}$ represents a distance between the emissive display layer 306 and the attenuation display layer 308. The variable $Z_{eye}$ represents a distance between the pupil 902 of the eye and the emissive display layer 306. The variable $Z_{display}$ represents a distance between the attenuation display layer 308 and the virtual image 312 of the emissive display. The variables $P_e$ and $P_a$ represent midpoints or centers of the emissive display layer 306 and the attenuation display layer 308, respectively, as light rays 314 originating from the real-world object 304 pass through the layers.

Given that the target for $T_B$ is to be a close approximation to $T_F$, the problem can be formulated as a constrained optimization to maximize the array of $t_B$ values with an L1 or L2 norm, subject to the constraint of Equation (2) above. This constrained optimization can be represented by Equation (4):

$$T_F(x,y) >= \sum_{i=x-k}^{x+k} \sum_{j=y-k}^{y+k} t_B(i,j) * W(i-x, j-x). \qquad (4)$$

However, such constrained optimizations may not be compatible with low-latency real-time computations, especially for a low-resource device like a wearable or other mobile computing device. Instead, the variable $t_B$ can be formulated as the minimum value of all pixels for a min kernel M centered on x,y with a domain equal to or larger than the convolution kernel $W(i,j)$.

A conservative set of $t_B$ values can then be computed using Equation (5):

$$t_B(x,y) = M * T_F = \Lambda_{i,j \text{ for all } M!=0} \text{ centered on } x, y T_F(i,j). \qquad *(5)$$

It is evident this satisfies Equation (4) because the $t_B(i,j)$ will be less than or equal to $T_F(x,y)$ for the scope of the kernel. Also, the convolution kernel $W(i,j)$ is normalized and does not take on negative weights. This relationship holds as long as the original blur kernel fits entirely within the min kernel domain of M. A min kernel may be chosen for optimum efficiency. However, a disadvantage of choosing a kernel that is too large is that such a too-large kernel leads to a larger dark region around the foreground graphic for which compensation is to be subsequently computed.

For circular camera apertures (e.g., human pupils and certain cameras), a circular min filter may be employed just slightly larger than the convolution diameter of the convolution kernel W. Alternatively, a square min filter may be used with a half-width greater than or equal to the W filter half-width $k$. A one-dimensional (1-D) min filter may be computed relatively efficiently given a spatially invariant filter width, using as few as three comparisons per pixel independent of the filter width. A two-dimensional (2-D) box min filter is separable, which allows for one pass for horizontal filtering and a second pass for vertical filtering. A circular filter may be computed as a merging of a set of 1-D filters, with a cost proportional to the filter height. For a fast circular filter, the min filter may be computed by combining a series of filter convolutions on each of the source scanlines for the kernel. The total cost is linear in the radius of the filter kernel.

Figure 10:
FIG. 10 illustrates an issue that can result from enlarging an attenuation graphic such that an undesirable dark region is visible.

FIG. 10 illustrates generally at 1000 an issue that can result from enlarging an attenuation graphic such that an unintended dark region 506 remains visible, becomes visible, or becomes more visible. For the image view shown in FIG. 10, compensation has already been implemented for an undesirable light region (e.g., an inner light halo) by a light region compensation module 604 (of FIG. 6). However, an unintended dark region 506 (e.g., an outer dark halo) persists. The unintended dark region 506 can actually be wider or thicker after compensating for the undesirable light region because the attenuation graphic is expanded in accordance with the dilation 810 (of FIG. 8).

An example simulated composite image view 1004 is shown. The unintended dark region 506 is shown in the vicinity of the border of the emissive graphic 104. A blurriness resulting from the attenuation graphic being out-of-focus as seen by an eye of a user is indicated by the blurry boundary 1002 for the unintended dark region 506. The unintended dark region 506 can be compensated for by the dark region compensation module 606 as is shown in FIGS. 11 and 12.

Figure 11:
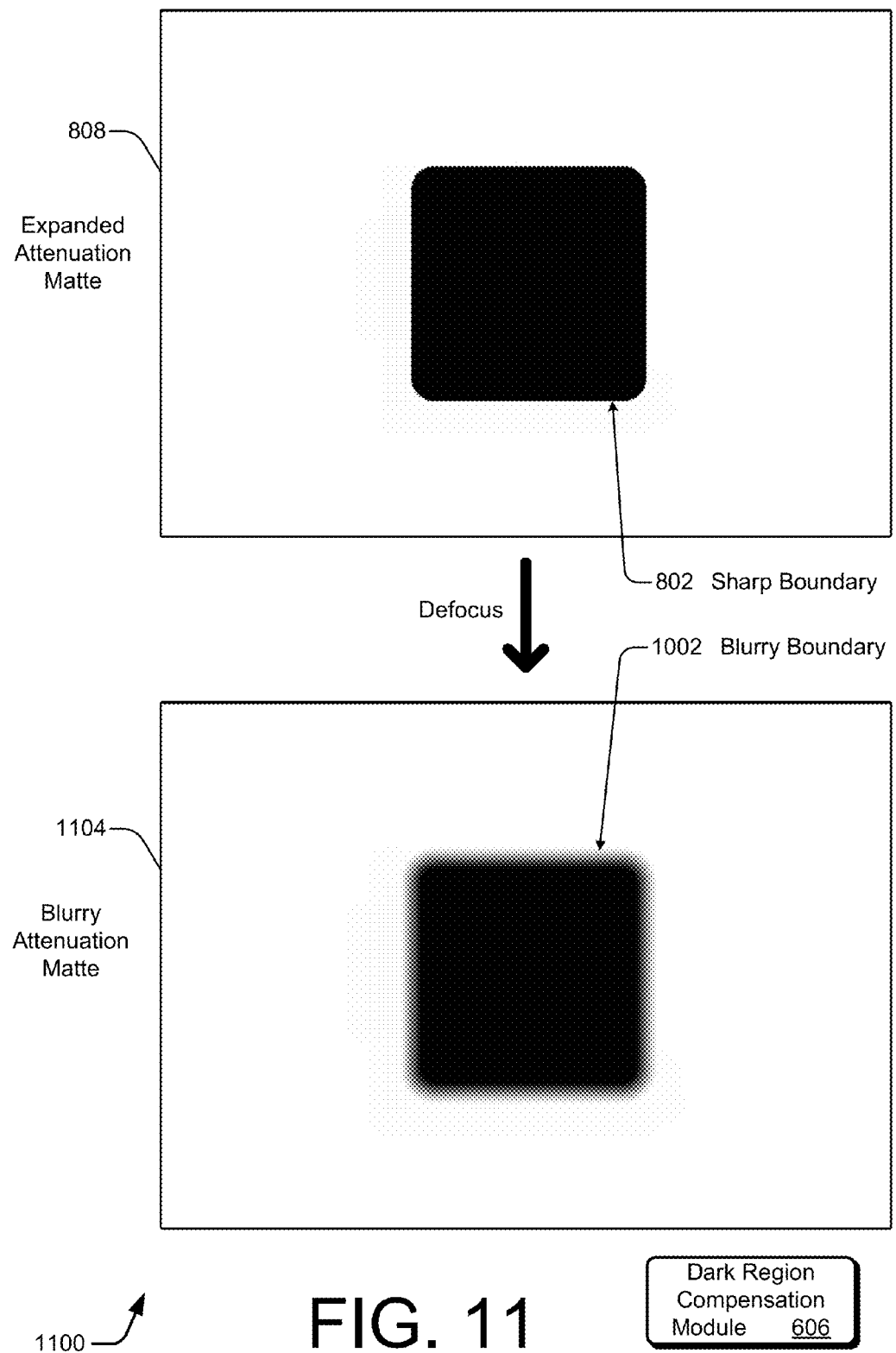
FIG. 11 illustrates example aspects for adjusting an attenuation matte to account for an out-of-focus attenuation graphic.

FIG. 11 illustrates generally at 1100 example aspects for adjusting an attenuation matte by a dark region compensation module 606 to account for an out-of-focus attenuation graphic 504 or 804 (of FIGS. 5A, 5B, and 8). An example of an expanded attenuation matte 808, which still has a sharp boundary 802, is depicted in the top half of FIG. 11, and an example of a blurry attenuation matte 1104 is depicted in the bottom half. The attenuation mattes use white portions to indicate which portions of an attenuation display layer 308 (of FIG. 3) are to remain transparent. After the dilation 810 (of FIG. 8) is performed, the expanded attenuation matte 808 corresponds to an expanded attenuation graphic 804.

The expanded attenuation graphic 804 appears out-of-focus to the eye of the user. Accordingly, to determine a size and appearance of the unintended dark region 506 having a blurry boundary 1002 (as also shown in FIG. 10), the dark region compensation module 606 defocuses the expanded attenuation matte 808. The dark region compensation module 606 defocuses the sharp boundary 802 of the attenuation graphic as represented in the expanded attenuation matte 808 to produce a blurry attenuation matte 1104 having the blurry boundary 1002. The blurry attenuation matte 1104, along with the sharp attenuation matte 704 (of FIG. 7), is used to produce an intensity replica mask of FIG. 12.

Figure 12A:
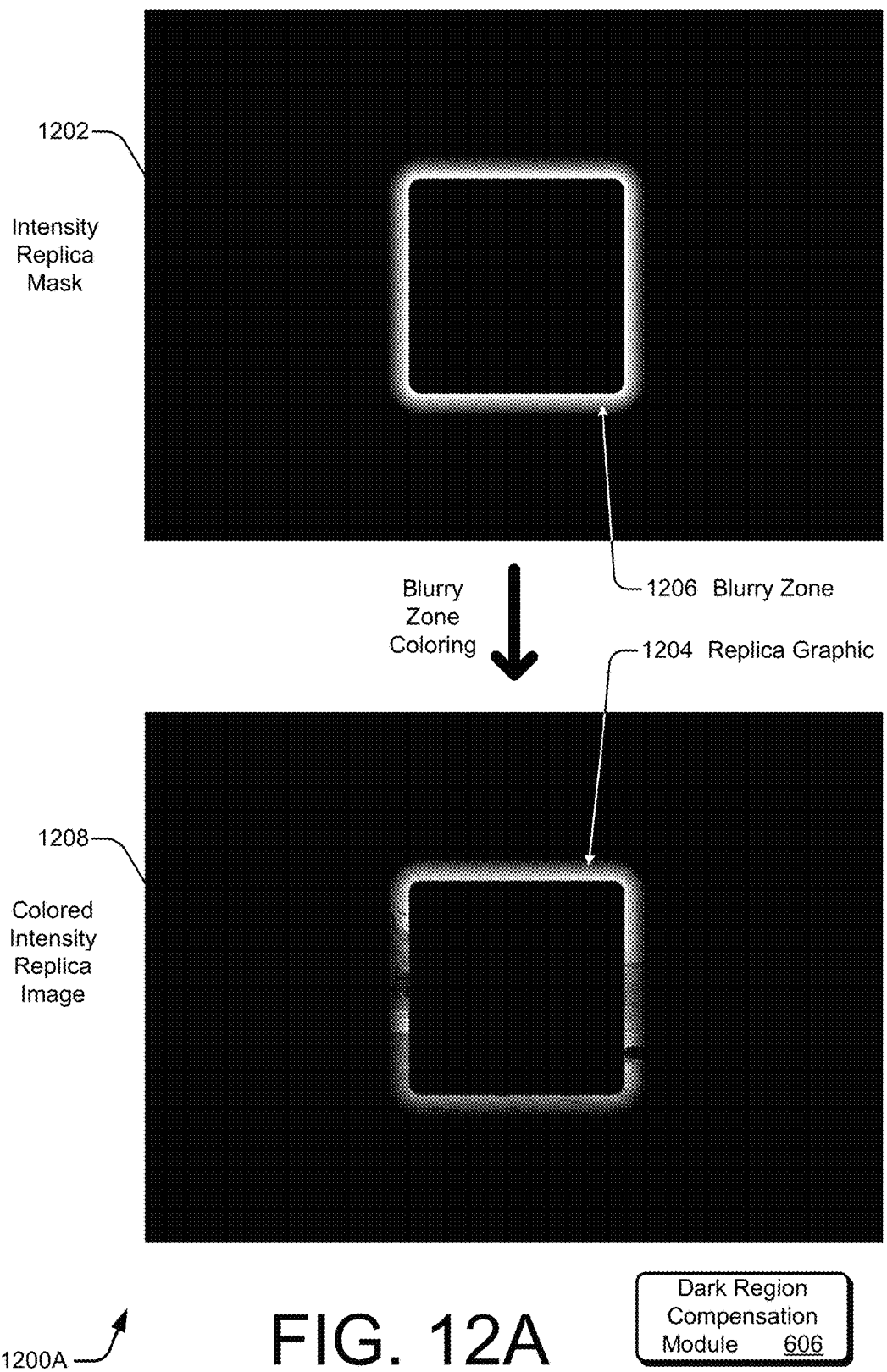

FIGS. 12A and 12B illustrate generally at 1200A and 1200B, respectively, example aspects for generating a replica graphic 1204 by a dark region compensation module 606 using an intensity replica mask. An example of an intensity replica mask 1202 for the emissive layer is depicted in the top half of FIG. 12A, and an example of a colored intensity replica image 1208 is depicted in the bottom half. The intensity replica mask 1202 is represented with white where pixels are to be displayed or colored by the emissive display layer 306 as shown in the colored intensity replica image 1208. Other portions of the emissive display layer that are not to be colored for the replica graphic are represented by black in the intensity replica mask 1208 and the colored intensity replica image 1208. The intensity replica mask 1202 includes a blurry zone 1206 corresponding to a combination of the zone 806 (of FIG. 8) and the blurry boundary 1002 (of FIGS. 10 and 11).

The dark region compensation module 606 produces the intensity replica mask 1202 by inverting the blurry attenuation matte 1104 (of FIG. 11) and adding (e.g., incorporating in a qualitative sense or multiplying in a quantitative sense) the sharp attenuation matte 704 (of FIG. 7). The dark region compensation module 606 also colors the blurry zone 1206 to form a replica graphic 1204 as shown in the colored intensity replica image 1208. To more clearly illustrate the coloration of the blurry zone 1206 to reproduce a brightness level or an appearance of the background scene, an enlarged view of the replica graphic 1204 is shown in FIG. 12B. A camera obtains data representative of light originating from the real-world scene. From this data representative of the real-world light, the dark region compensation module 606 identifies the data corresponding to the real-world scene behind the blurry zone 1206. Replica pixels are colored based on the light data so as to reproduce the real-world scene being blocked by the out-of-focus, blurry-appearing, and expanded attenuation graphic. Thus, the dark region compensation module 606 colors the blurry zone 1206 to produce the colored intensity replica image 1208 that includes the replica graphic 1204. The replica graphic 1204 reproduces the appearance of the real-world scene in the vicinity of the border around the emissive graphic based on the data from the camera. An appearance of a general light or brightness level of the real-world scene, or of an actual specific coloration of the real-world scene, may be reproduced by the replica graphic 1204.

Example operations for the dark region compensation module 606 are described qualitatively above. Example operations for the dark region compensation module 606 are presented below in quantitative terms with a more computationally rigorous description. To facilitate understanding by simplifying the mathematical description, the emissive display layer is referred to as the foreground, and the real-world scene is referred to as the background.

Using the circular kernel min-transparency algorithm described above for the light region compensation module, the expanded attenuation matte 808 (of FIGS. 8 and 11) is dilated by a circular min filter. The effect of lens blur on the dilated expanded attenuation matte 808 having the sharp boundary 802 is shown as the blurry attenuation matte 1104. This blurry attenuation matte 1104 is used to modulate incoming light from the real-world background obtained via a camera. In order to defocus the expanded attenuation matte 808 to produce the blurry attenuation matte 1104, Equation (2) above is applied to compute the estimated blurred occluder matte $T_B(x,y)$ using a lens-blur kernel for a nearly circular aperture.

The colored intensity replica image 1208, which is designated $I_R$, can be used to compensate for an outer dark halo. The colored intensity replica image 1208 is computed as shown in Equation (6):

$$I_R = T_F(1-T_B)I_B, \qquad (6)$$

where $I_B$ is the intensity of the background as obtained via a camera, $T_B$ is the blurry attenuation matte 1104, and $T_F$ represents a foreground implementation of the sharp attenuation matte 704. The emissive display image $I_E$, which is a combination of the emissive graphic 104 and the replica graphic 1204, is computed as shown in Equation (7):

$$I_E = (1-T_F)I_F + I_R, \qquad (7)$$

where $I_F$ is the intensity of the emissive graphic 104.

Figure 13:
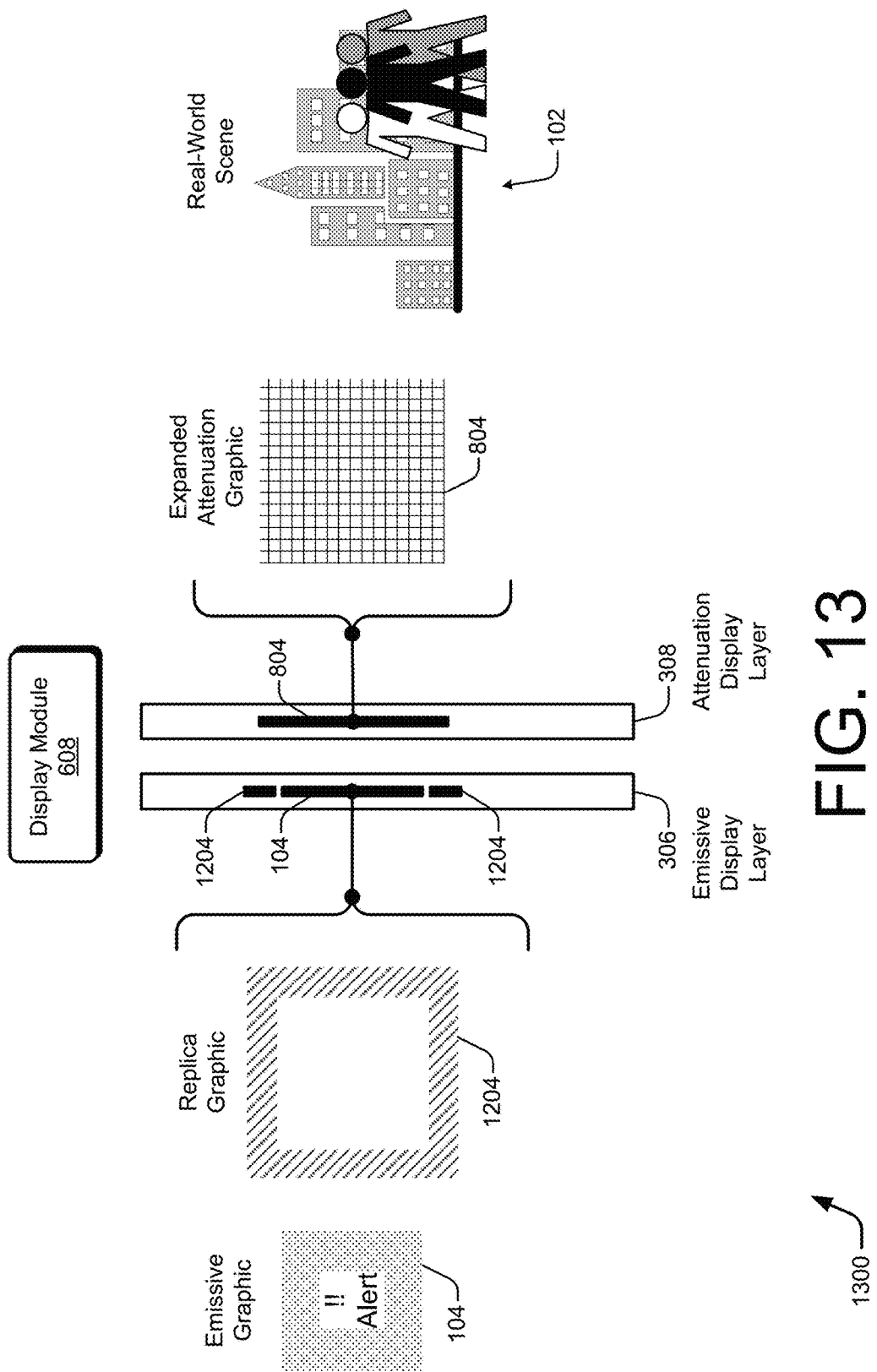
FIG. 13 illustrates a schematic diagram of an augmented reality apparatus enhancing a composite image view.

FIG. 13 illustrates a schematic diagram 1300 of an augmented reality apparatus enhancing a composite image view (not shown) with a dilated or expanded attenuation graphic 804 and a replica graphic 1204. As illustrated, the display module 608 causes or instructs the emissive display layer 306 to display the emissive graphic 104 and the replica graphic 1204. The display module 608 also causes or instructs the attenuation display layer 308 to display the expanded attenuation graphic 804. The eye of the user composites the emissive graphic 104 and the replica graphic 1204 over the real-world scene 102, which is affected by the light-blocking property of the expanded attenuation graphic 804. This results in a compensated image view, which is shown in FIG. 14.

Figure 14:
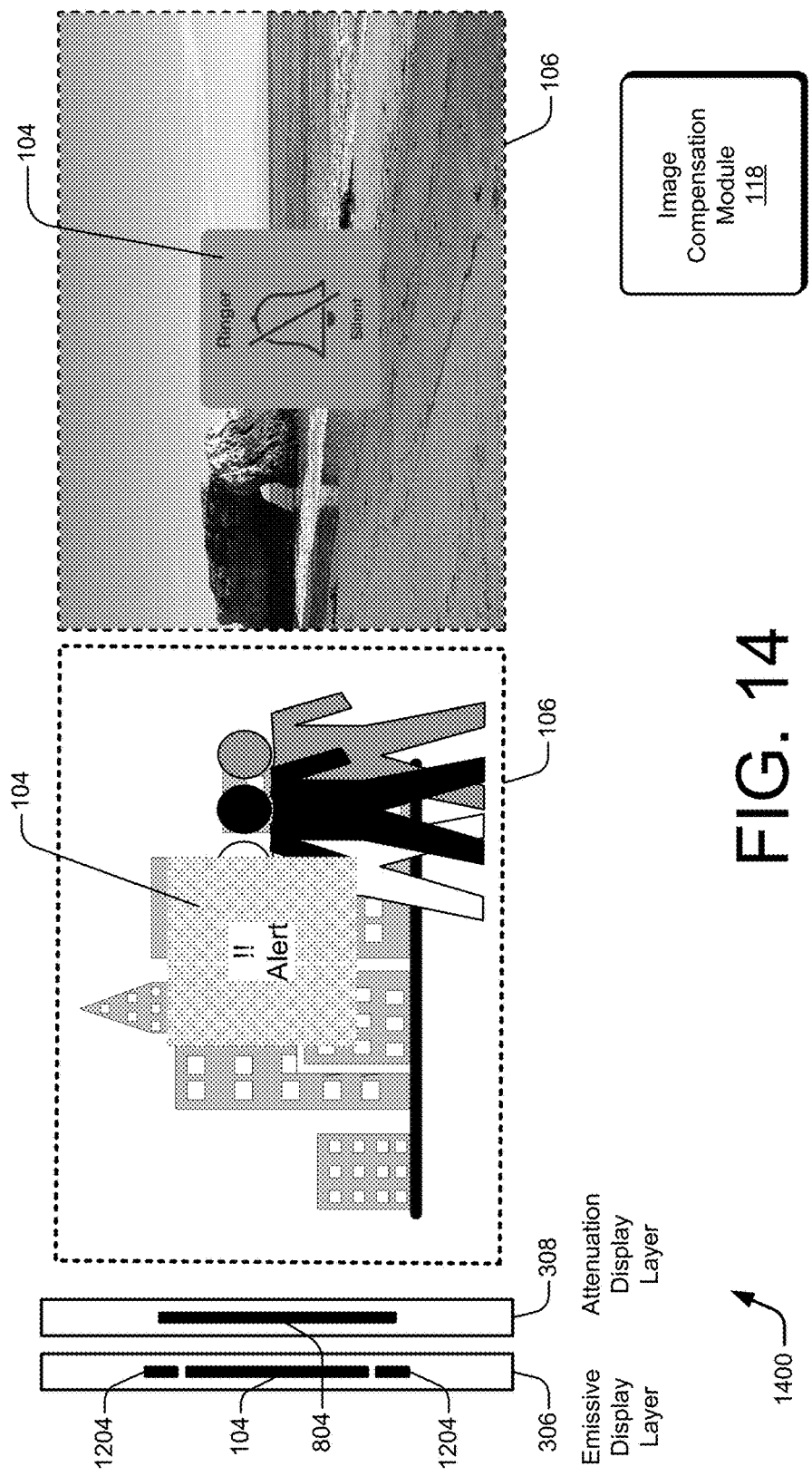
FIG. 14 illustrates an example result of an image compensation for an occluding graphic by an image compensation module of an augmented reality apparatus.
Figure 15:
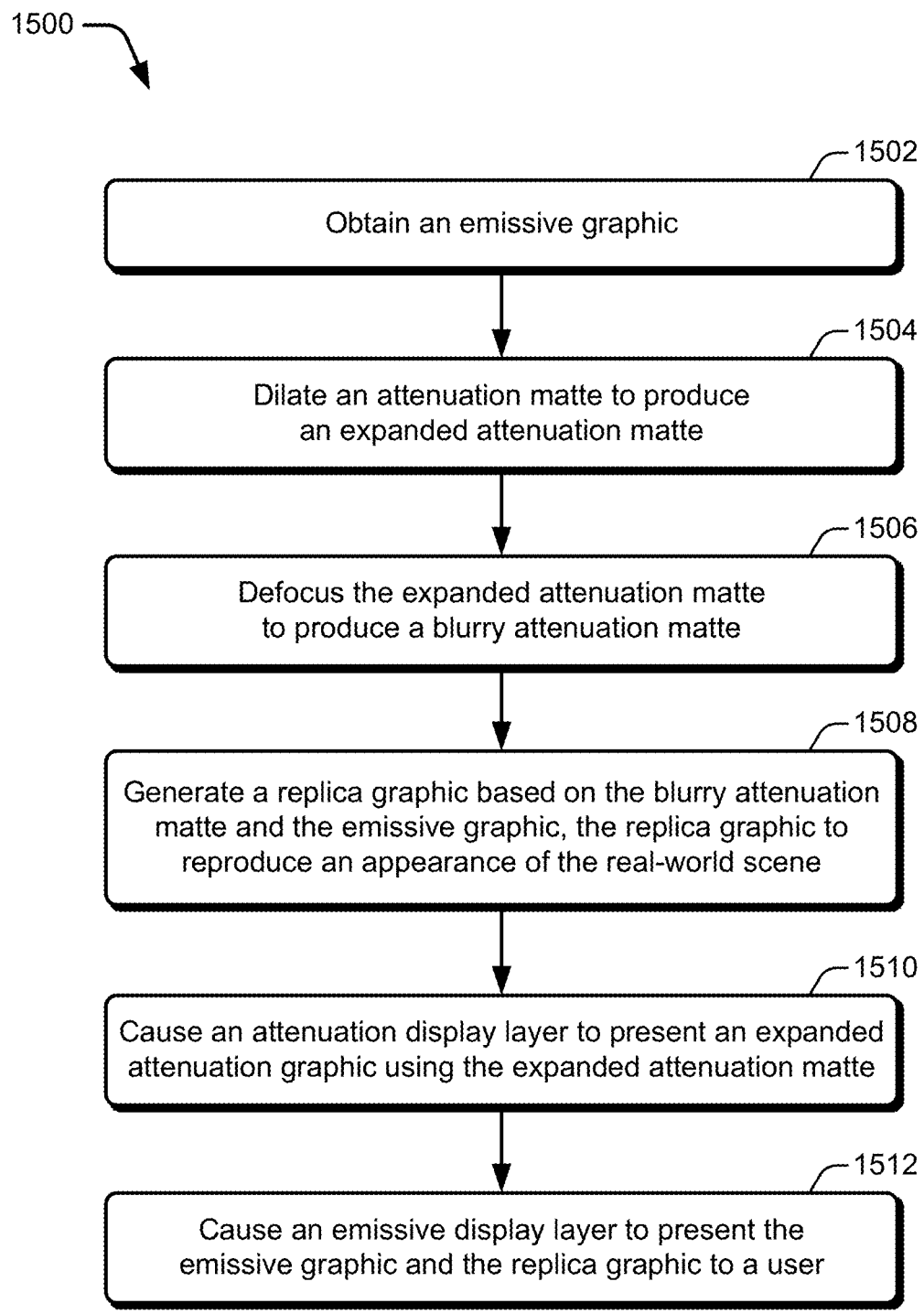
FIG. 15 is a flow diagram illustrating an example procedure in accordance with one or more example embodiments.

FIG. 14 illustrates generally at 1400 an example result of an image compensation for an occluding graphic by an image compensation module 118. On the left, the emissive display layer 306 and the attenuation display layer 308 are depicted in a cut-away side view. The emissive display layer 306 is displaying an emissive graphic 104 and a replica graphic 1204, and the attenuation display layer 308 is displaying an expanded attenuation graphic 804. An example of a schematic composite image view 106 is in the middle, and an example of a simulated composite image view 106 is on the right. The emissive graphic 104 is indicated in each composite image view 106. In the compensated image views as shown, no undesirable light region or undesirable dark region is visually apparent.

Having discussed example details of systems, techniques, and schemes for image compensation for an occluding direct-view augmented reality system, consider now some example procedures to illustrate additional aspects of the techniques.

Example Procedures

This section describes with reference to FIG. 15 example procedures relating to image compensation for an occluding direct-view augmented reality system in one or more embodiments. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example augmented reality apparatus 108 in conjunction with a computing device 112 that makes use of an image compensation module 118 (e.g., of FIGS. 1, 6, and 14).

FIG. 15 is a flow diagram 1500 including six blocks 1502-1512 and illustrating an example procedure for image compensation for an occluding direct-view augmented reality system in accordance with one or more example embodiments. At block 1502, an emissive graphic is obtained. For example, a computing device 112 may obtain an emissive graphic 104 having information to be presented to a user 110. An augmented reality apparatus 108 can receive a text message alert notification from a mobile phone, a navigational instruction from a remote cloud server, or a battery indication from a local operating system function that is to be presented to the user 110 by adding the emissive graphic 104 to a composite view that also includes a direct-view of a real-world scene 102. The emissive graphic 104 may also be supplied with an attenuation matte. If not supplied, the attenuation matte may be generated from the emissive graphic 104, such as by thresholding or otherwise mapping intensity values of an intensity map 702 to obtain transparency values for the attenuation matte, such as a sharp attenuation matte 704.

At block 1504, an attenuation matte is dilated to produce an expanded attenuation matte. For example, a computing device 112 may dilate an attenuation matte, such as a sharp attenuation matte 704, to produce an expanded attenuation matte 808. The expanded attenuation matte 808 is associated with the emissive graphic 104. The sharp attenuation matte 704, prior to a dilation 810, corresponds to an attenuation graphic 504 that may be sized comparably to the emissive graphic 104. Further, the attenuation graphic 504 or 804 is responsible for blocking light for the corresponding emissive graphic 104. To perform the dilation 810, at least one sharp boundary 802 of the sharp attenuation matte 704 can be expanded beyond an edge 706 of the emissive graphic 104 based on an attribute of an eye 302 of the user 110. The attribute can be a size of a physical characteristic of the eye 302, such as a measure of a radius or diameter of a pupil 902 of the eye 302 used to tune a filter applied to the sharp attenuation matte 704 for the dilation 810 to produce the expanded attenuation mate 808, which corresponds to an expanded attenuation graphic 804.

At block 1506, the expanded attenuation matte is defocused to produce a blurry attenuation matte. For example, a computing device 112 may defocus the expanded attenuation matte 808 to produce a blurry attenuation matte 1104. To account for eye lens blur due to an out-of-focus expanded attenuation graphic 804, the expanded attenuation matte 808 is defocused based on an attribute of the eye 302, such as physical characteristic thereof. A convolutional kernel tuned by a physical characteristic of the eye may be applied to defocus the sharp boundary 802 of the expanded attenuation matte 808 to produce a blurry boundary 1002 of the blurry attenuation matte 1104.

At block 1508, a replica graphic is generated based on the blurry attenuation matte and the emissive graphic, wherein the replica graphic is to reproduce an appearance of the real-world scene. For example, a computing device 112 may generate a replica graphic 1204 based on the blurry attenuation matte 1104 and the emissive graphic 104. The replica graphic 1204 is to reproduce an appearance of the real-world scene 102 in a region bordering the emissive graphic 104. To do so, data for light originating from the real-world scene 102 is used to modulate (e.g., color) the pixels of the replica graphic 1204 using an intensity replica mask 1202 to produce a colored intensity replica image 1208. The intensity replica mask 1202 can be created by inverting the blurry attenuation matte 1104 and modifying the inverted blurry attenuation matte based on a sharp attenuation matte 704, which corresponds to a size and shape of the emissive graphic 104.

At block 1510, an attenuation display layer presents an expanded attenuation graphic using the expanded attenuation matte. For example, a computing device 112 may cause an attenuation display layer 308 to present an expanded attenuation graphic 804 using the expanded attenuation matte 808 after the dilation 810. To effectuate the presentation, the attenuation display layer 308 can activate pixels of the attenuation display layer 308 (e.g., render the pixels opaque) that correspond to the expanded attenuation graphic 804 as defined by the black area of the expanded attenuation matte 808 to block light for the emissive graphic 104 and the replica graphic 1204.

At block 1512, an emissive display layer presents the emissive graphic and the replica graphic to a user. For example, a computing device 112 may cause an emissive display layer 306 to present the emissive graphic 104 and the replica graphic 1204 to the user 110. To effectuate the presentation, the emissive display layer 306 can activate pixels (e.g., render the pixels brighter or colored) in areas represented by an intensity map 702 for the emissive graphic 104 and by a colored intensity replica image 1208 for the replica graphic 1204.

Having described example procedures in accordance with one or more embodiments, consider now an example system and device that can be utilized to implement the various schemes and techniques described herein.

Accuracy and Error Analysis

With an augmented reality apparatus, the foreground emissive light may be presented to be focused at a fixed distance. If so, certain implementations as described herein provide an approximation in which compensating graphics presented by an emissive display layer are at a depth and resolution determined by the emissive display layer. The directly-viewed background, however, is constrained by the optical performance of the eye of the viewer and the glass through which the light passes (e.g., including diffraction effects from the attenuation display layer).

To reduce the image artifacts that are perceivable, a replica graphic (e.g., a foreground compensation image) can be restricted to as small a boundary region as is feasible (e.g., such that a corresponding attenuation graphic can still eliminate an inner light halo when faced with lens blur) and to as low a brightness as is feasible (e.g., so as to still avoid a perceptible dip in brightness for an outer dark halo). An additional factor that can impact described implementations is the potential for optical misalignment between graphics of the attenuation display layer and graphics of the emissive display layer, which can result due to the uncertainty of eye position. There may also be misalignment between estimated views of the background scene and light actually originating from the background. Further, misalignment can be introduced by errors in a pupil size estimate. Careful implementation of the techniques described herein can enable these issues or factors to be handled appropriately.

An augmented reality apparatus may include a forward-looking camera to allow for the computation and selection of an occlusion by an emissive graphic with respect to real-world objects. This can involve making a depth estimate of the real world as well as obtaining an intensity image. Such apparatus and related functionality can be sufficient to develop an estimate of the view of the world as seen from one or both eyes, based on an estimated camera model. From this information, depths can be estimated, and camera-acquired images can be warped to function as background images for described implementations.

Figure 16A:
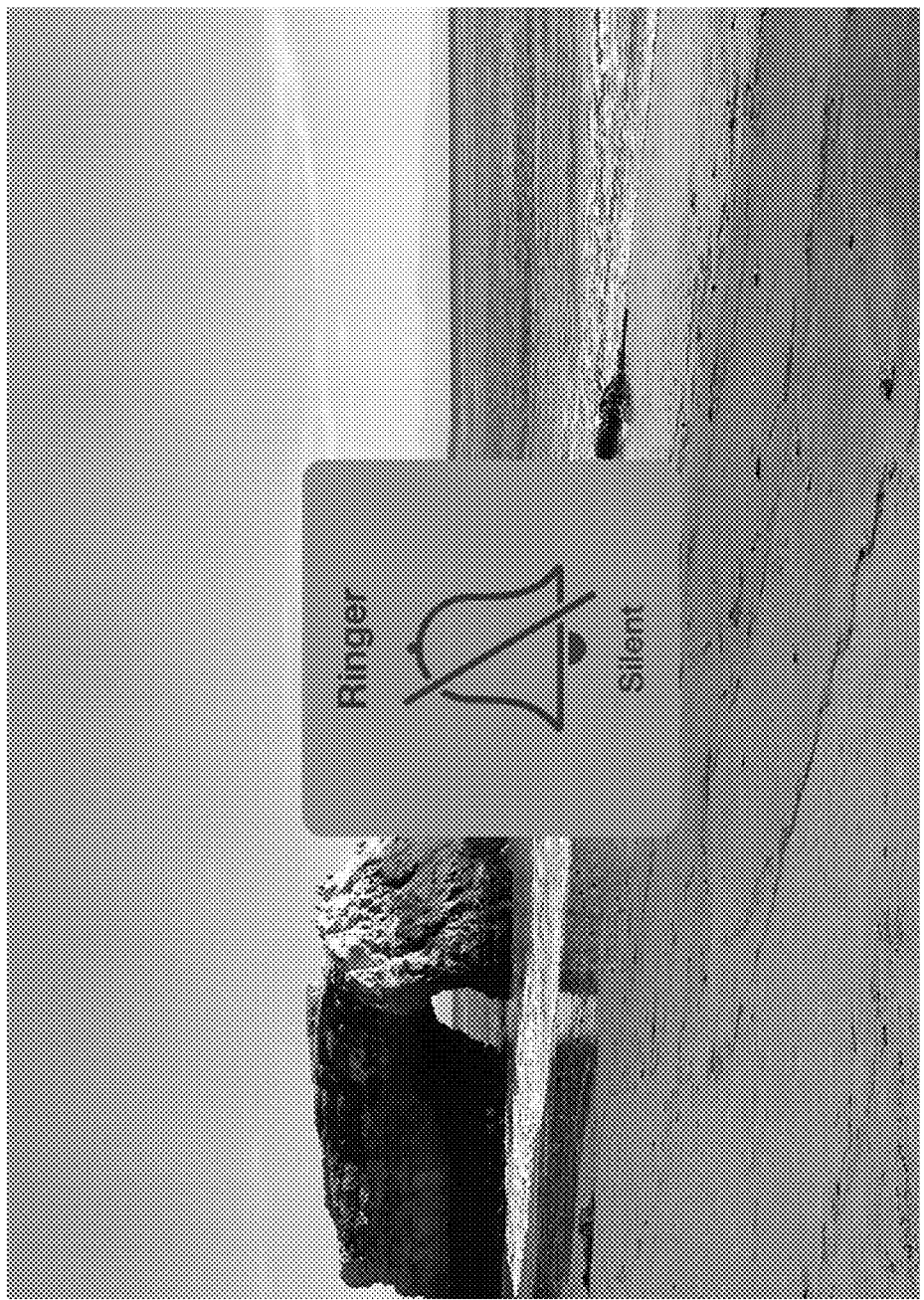
FIGS. 16A and 16B illustrate two examples of simulated composite image views resulting from a misalignment.
Figure 16B:
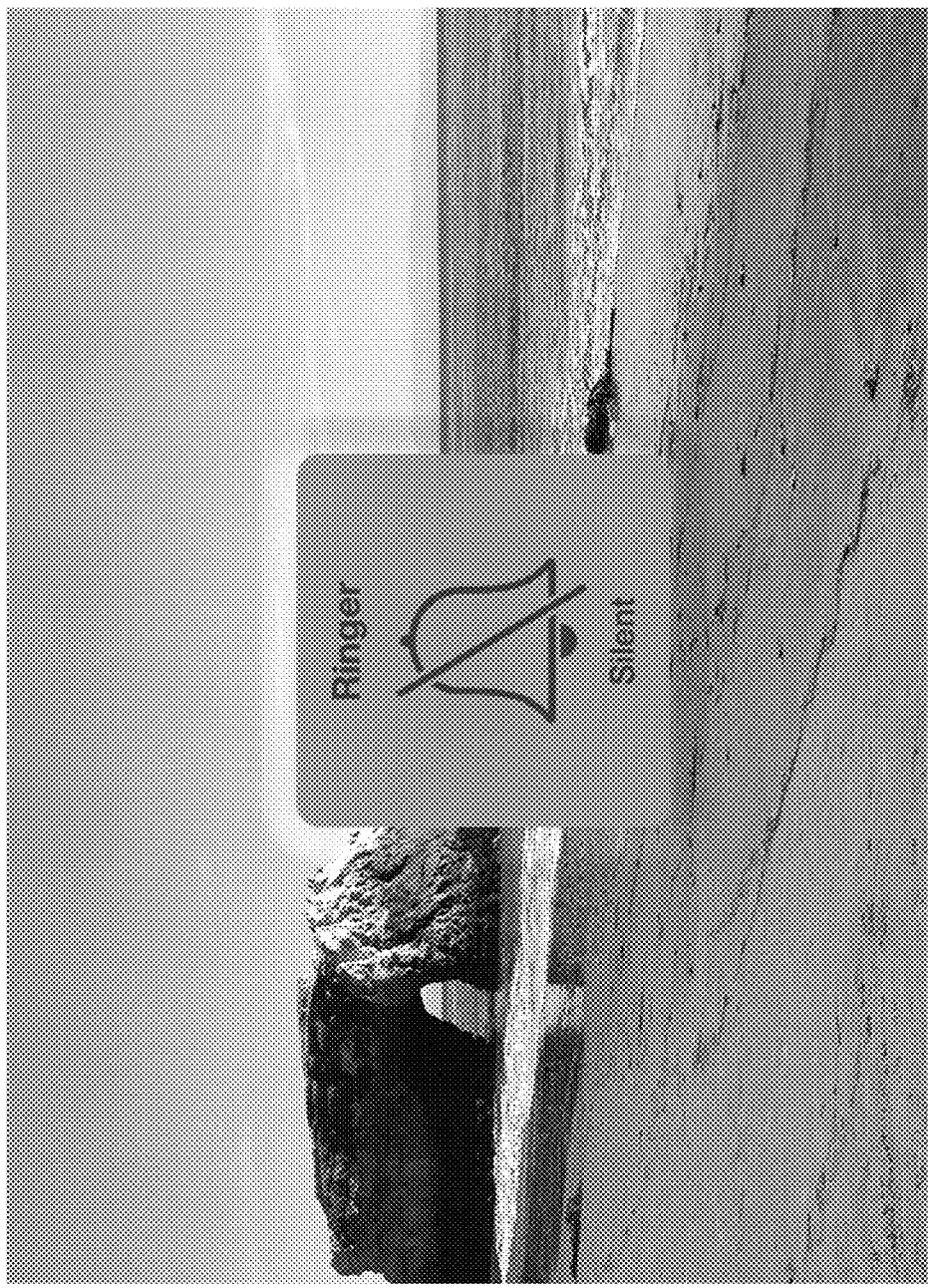

With an optical system, multiple forms of misalignment may develop. For example, the estimated background Is may be shifted relative to the true background as observed by the eyes of the viewer. FIGS. 16A and 16B illustrate at 1600A and 1600B, respectively, two examples of simulated composite image views resulting from a misalignment. Composite image view 1600A shows a situation in which the estimated background is shifted relative to the true background by three pixels in the vertical and horizontal directions. A double image for some of the finer details appears in the halo of the foreground graphic, mostly visible along the horizon line. Nevertheless, the results are relatively acceptable because the replica graphic cross-dissolves smoothly with the true background as distance from the boundary of the foreground emissive graphic increases (e.g., because the ramp-structure of the intensity replica mask enables the replica graphic to cross-dissolve with the true background to therefore diminish the appearance of artifacts). This type of misalignment is likely to occur due to a reconstruction error from the camera/geometry capture system, or if the user's head is in motion. The inherent latency in the camera and graphics system causes the estimated background to be shifted relative to ground truth. However, advanced-sensing and low-latency rendering architectures can at least partially accommodate rotational and other motions to minimize these effects.

Composite image view 1600B shows a second form of misalignment that can occur if the blurry attenuation matte for the attenuation display layer is displaced relative to its estimated position for the emissive display layer. This may happen due to parallax between the emissive and attenuation display layers combined with eye-position estimation error (e.g., if the pupil position was inaccurately estimated relative to the display). This results in a darkening of the halo on one side and a brightening of the halo on the other side, as is shown for a three-pixel misalignment. The severity of the brightness shift depends on the slope of the blurred attenuation graphic. Thus, for occluders that are more out-of-focus, the shift is less sensitive to misalignment. Similar artifacts occur for other estimation errors in the occluder geometry, including rotation and scaling of the estimated occluder geometry as compared to the ground truth.

Figure 17A:
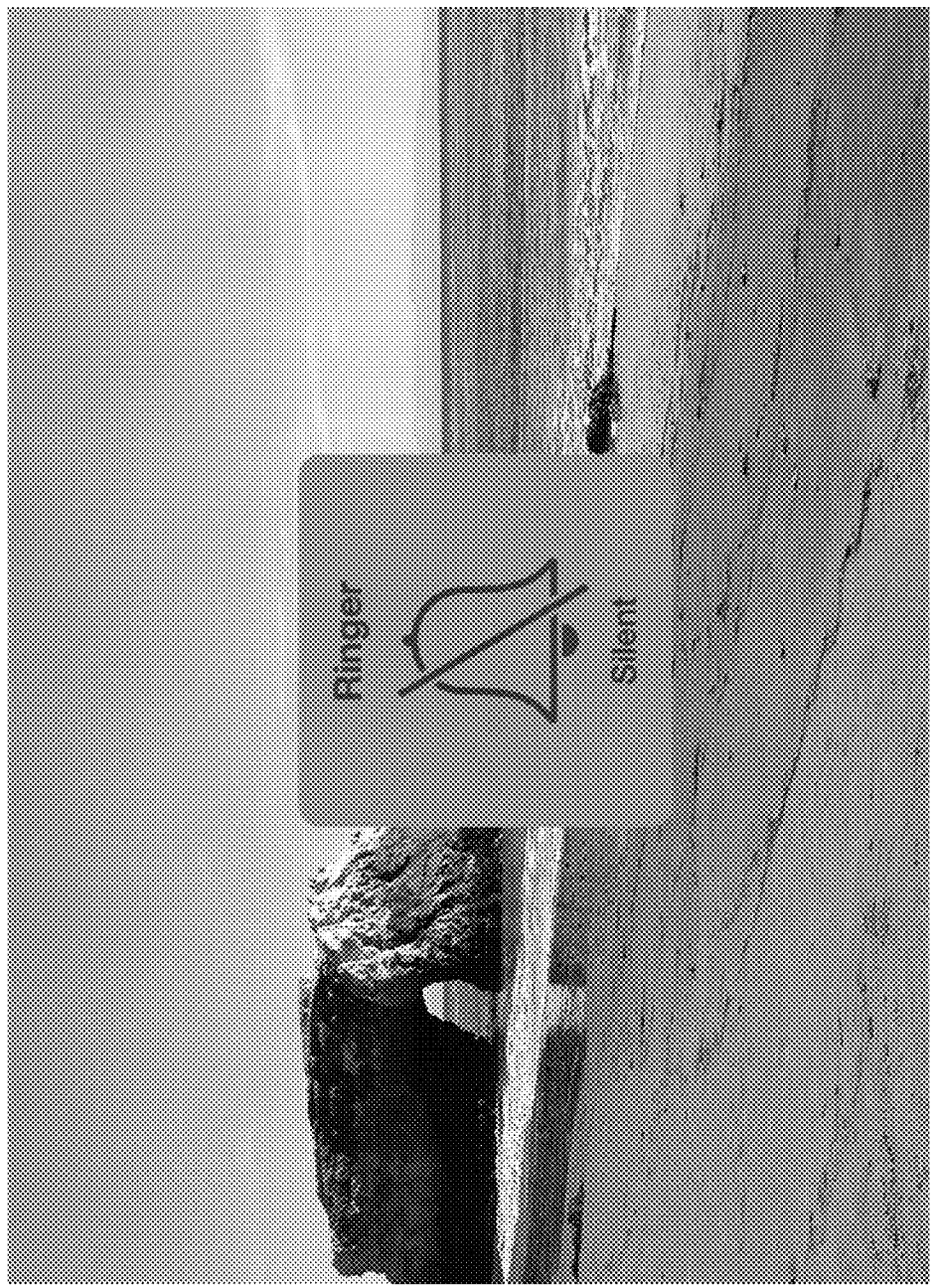
FIGS. 17A and 17B illustrate two examples of simulated composite image views resulting from overestimating the effects of image blur.
Figure 17B:
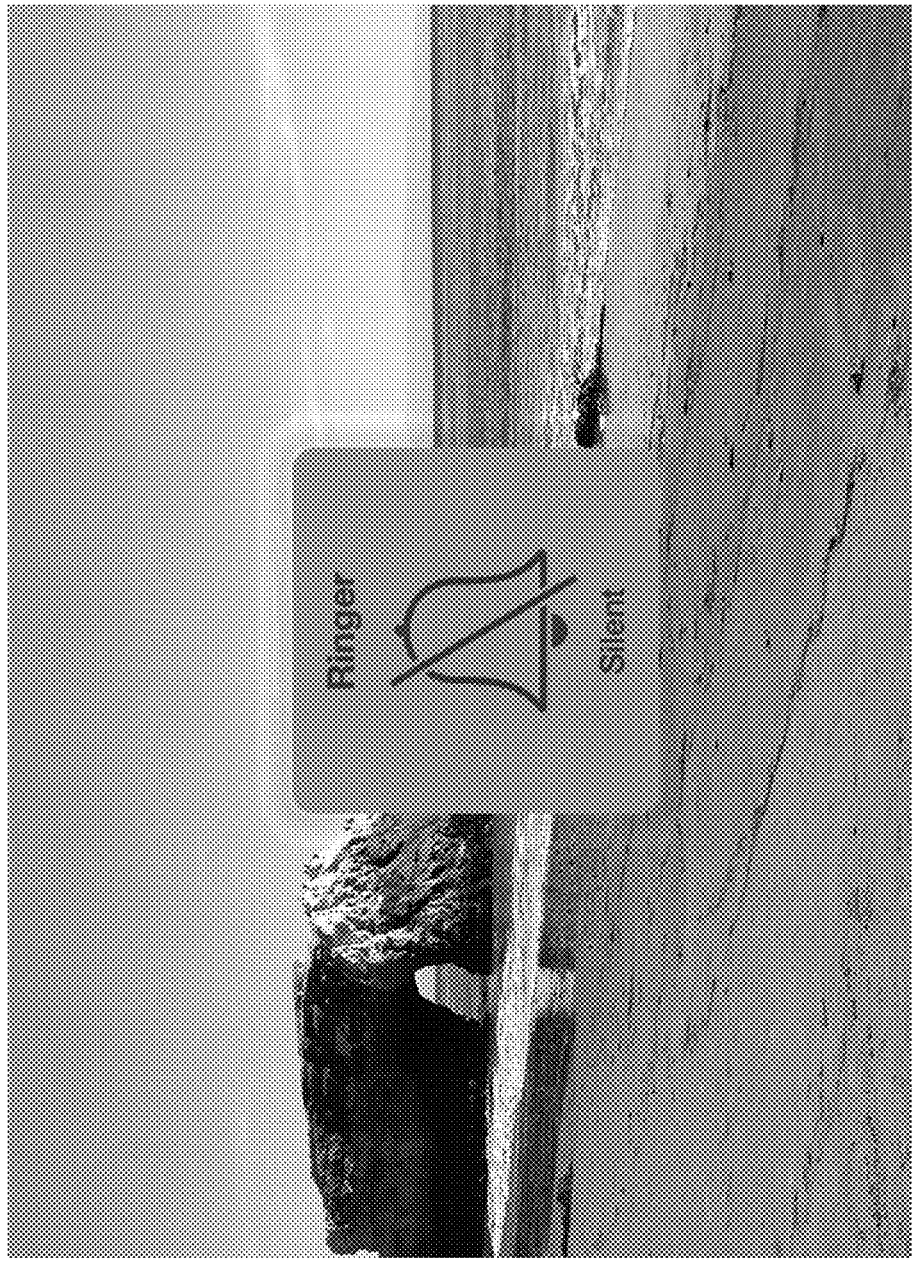

A visible artifact can appear as a result of errors in estimating the pupil diameter of the eye (e.g., or when defocusing to blur the occluder). FIGS. 17A and 17B illustrate at 1700A and 1700B, respectively, two examples of simulated composite image views resulting from overestimating the effects of image blur. Specifically, an actual lens blur for an attenuation graphic is 10% smaller than the estimated blur used for the simulated composite image view 1700A, and an actual lens blur for an attenuation graphic is 20% smaller than the estimated blur used for the simulated composite image view 1700B. A halo around the foreground graphic is hard to see at the 10% error but is much more visible at the 20% error.

Figure 18A:
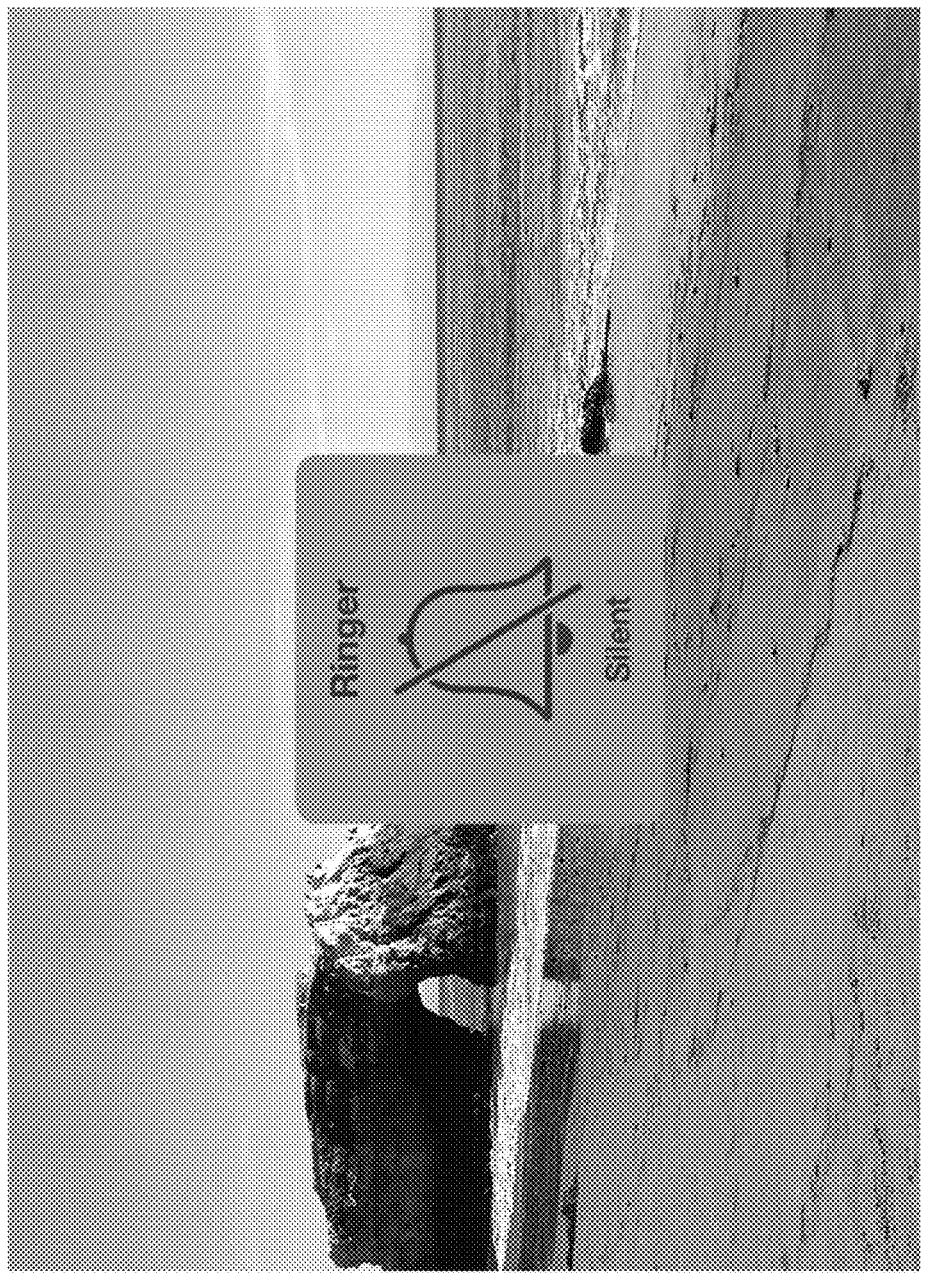
FIGS. 18A and 18B illustrate two examples of simulated composite image views resulting from underestimating the effects of image blur.
Figure 18B:
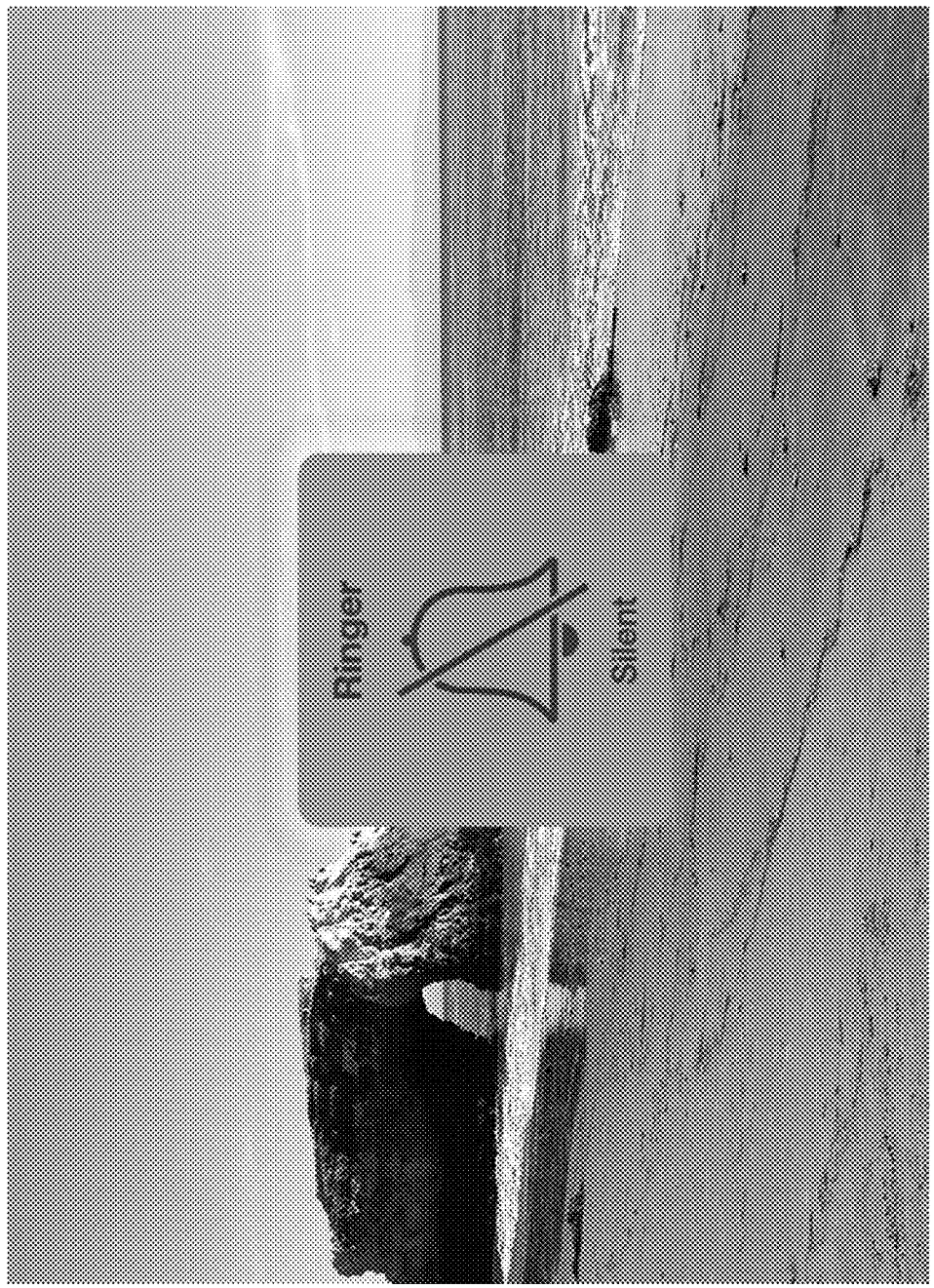

FIGS. 18A and 18B illustrate at 1800A and 1800B, respectively, two examples of simulated composite image views resulting from underestimating the effects of image blur. Specifically, an actual lens blur for an attenuation graphic is 3% larger than the estimated blur used for the simulated composite image view 1800A, and an actual lens blur for an attenuation graphic is 10% larger than the estimated blur used for the simulated composite image view 1800B. A halo appears around the foreground graphic that is barely visible at the 3% error, but is appreciably more visible at the 10% error. This implies that an example of a suitable guideline for pupil size estimation accuracy is less than or equal to 3% to appropriately account for potential pupil size estimation issues.

Figure 19A:
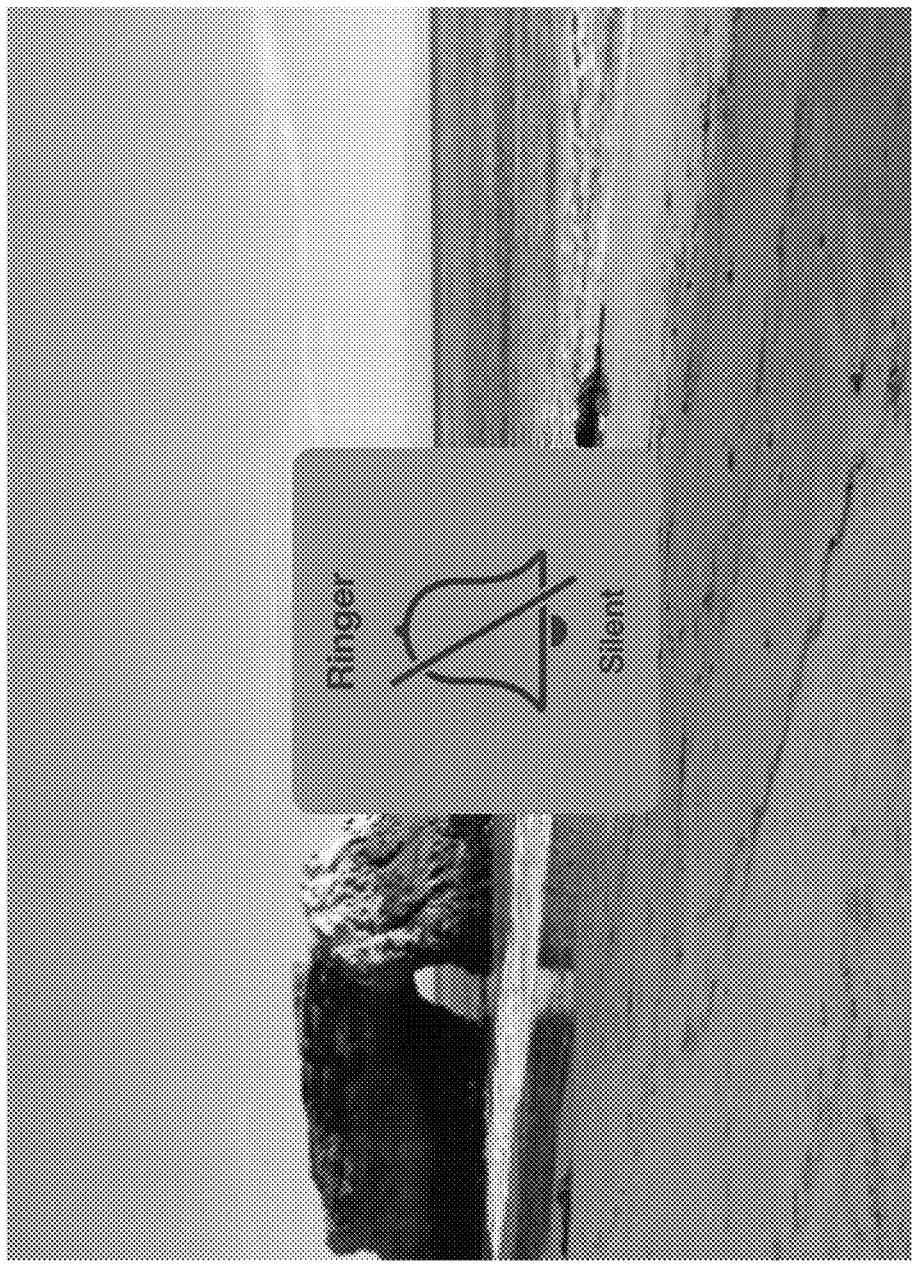
FIGS. 19A and 19B illustrate two examples of simulated composite image views resulting from a user focusing at a different depth than that of the background.
Figure 19B:
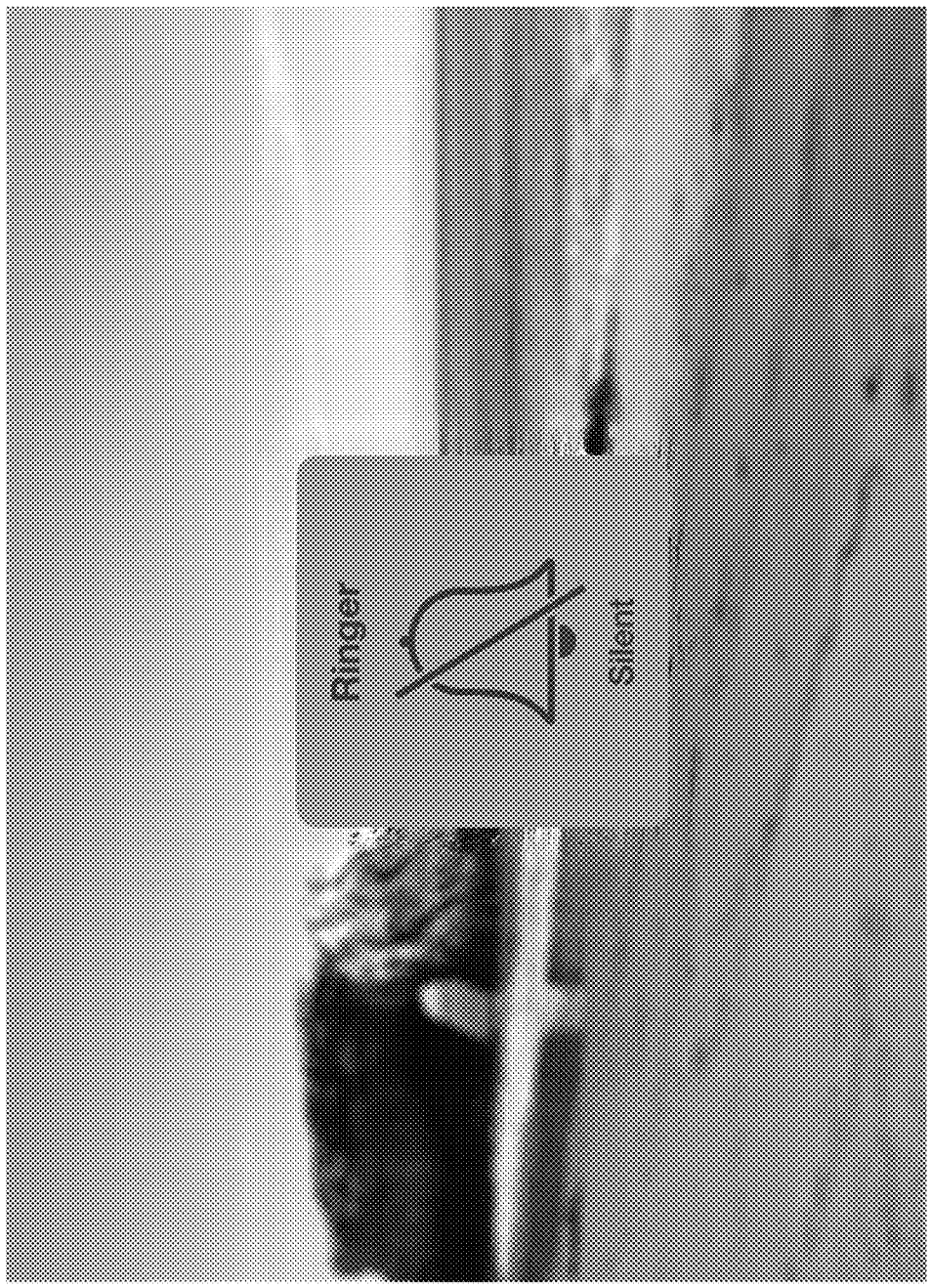

An additional form of error may be introduced due to the accommodation of the user's eyes to different depths. FIGS. 19A and 19B illustrate at 1900A and 1900B, respectively, two examples of simulated composite image views resulting from a user focusing at a different depth or plane than that of the background. Specifically, the images of FIGS. 19A and 19B show the effect of accommodation if the user is focused on the foreground graphic and the background is therefore blurred. An in-focus halo is visible around the foreground graphic in both composite image views. In simulated composite image view 1900A, a relatively subtle halo is visible around the foreground graphic with the replica-derived halo having a crisper level of detail than the rest of the background. In simulated composite image view 1900B, a relatively more-apparent halo is visible around the foreground graphic. This composite image view 1900B shows the background blurred using a lens blur twice as large as that of the composite image view 1900A. Consequently, the in-focus halo is more visible against the relatively blurrier background of the composite image view 1900B.

The effect of this issue can be ameliorated by defocusing the replica graphic (e.g., the estimated background) using depth information and an estimate of the depth of field for the eyes, which can be based on pupil size and eye convergence. For example, this defocusing can be based on adjusting the capturing camera to have a similar depth of field and focus depth as that of the human eye (e.g., employing a hardware solution) or based on synthesizing the effect using a depth map and image filters (e.g., employing more of a software solution). Alternatively, the scene can be captured using a light-field camera. An appropriate focal depth can be determined by tracking the eyes of the user, and using the convergence of the eyes to estimate the depth accommodation. However, these kinds of artifacts may be acceptable without accommodating for focus depth if relatively small amounts of blurring are involved, such as that shown in the simulated composite image view 1900A.

Figure 20:
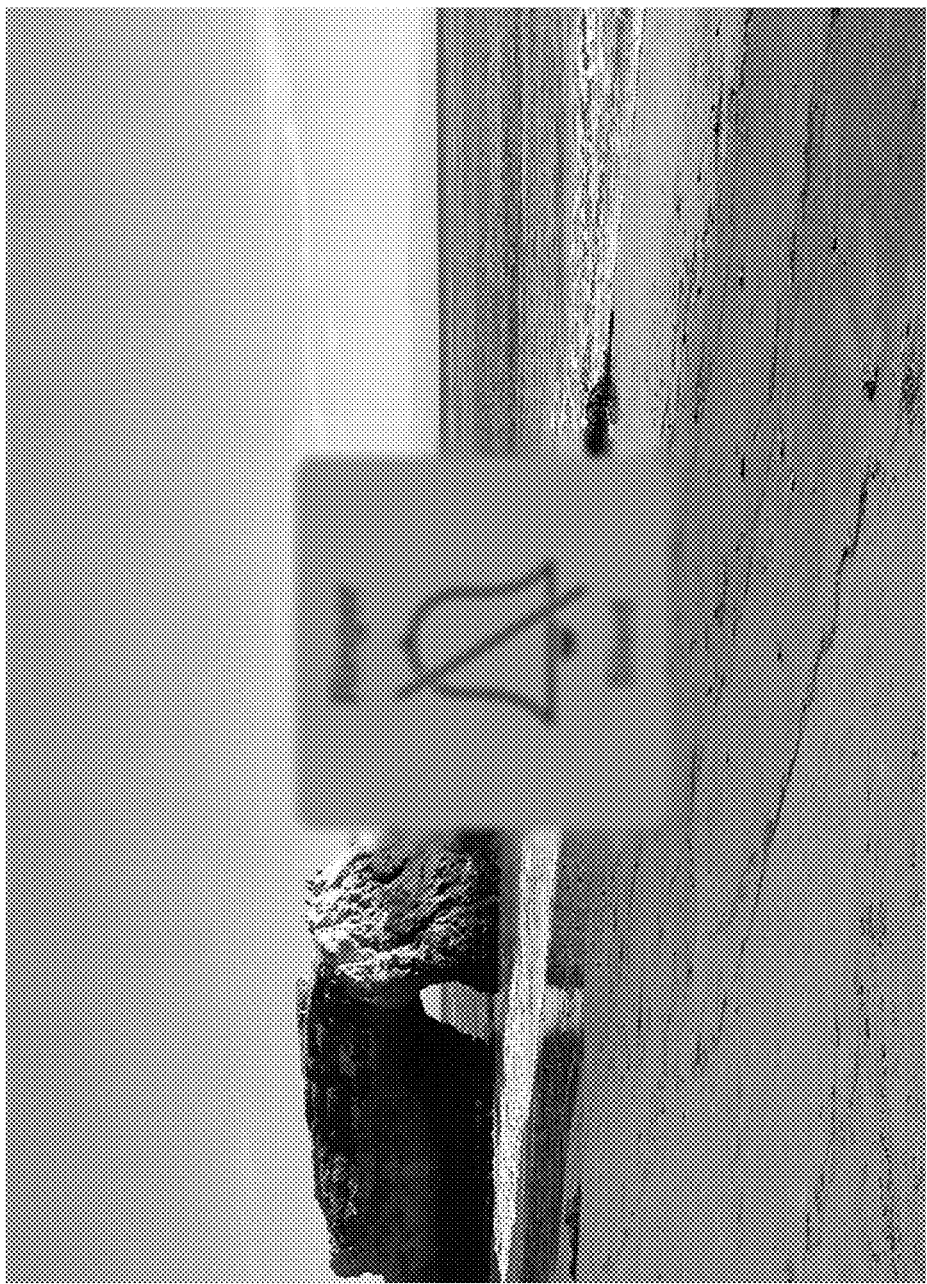
FIG. 20 illustrates an example of a simulated composite image view resulting from a user focusing at the depth of the background.

Another issue can occur if the user accommodates on the background, which can cause the foreground to be blurred. FIG. 20 illustrates an example of a simulated composite image view 2000 resulting from a user focusing at the depth of the background. Consequently, a blurry, replica-based halo surrounds the foreground graphic because the emissive display layer is out-of-focus to the eye. To avoid this effect, a light field foreground optical layer can be implemented. Alternatively, a multi-plane emissive display layer can be used in which the focal depth of a graphic in the foreground can be adjusted by setting which depth plane each emissive pixel is presented on. With a multi-plane emissive display layer, image compensation pixels of a replica graphic are placed onto the depth plane most closely matching the background depth for each respective pixel.

Example System and Device

Figure 21:
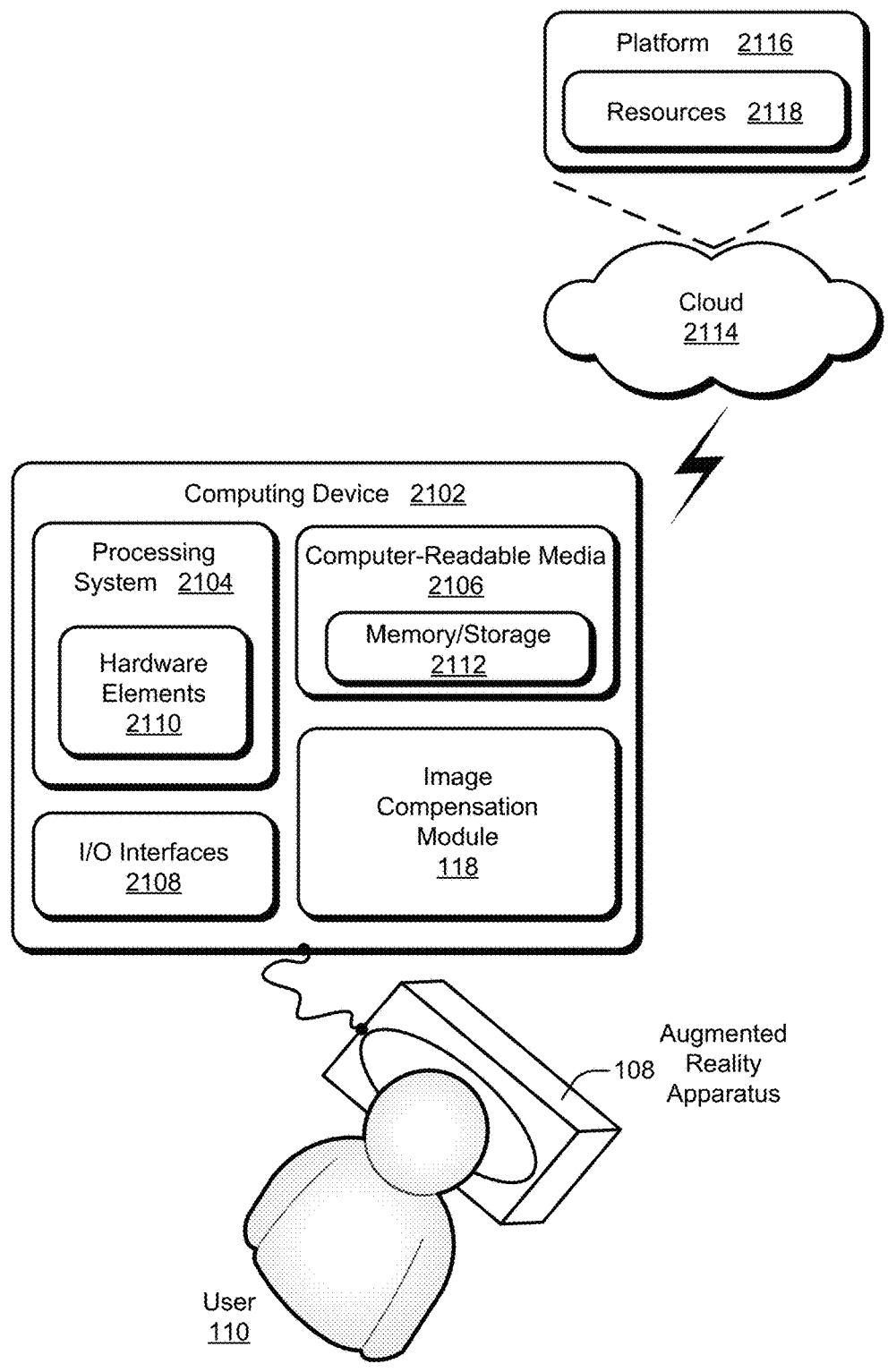
FIG. 21 illustrates an example system or device employable for embodiments of image compensation for an occluding direct-view augmented reality system.

FIG. 21 illustrates an example system generally at 2100 including an example computing device 2102 representative of one or more computing systems or computing devices that may implement the various techniques described herein. This is illustrated through the inclusion of an image compensation module 118, which may operate as described herein above. A computing device 2102 may be implemented as, for example, a computing device 112 (of FIG. 1) coupled to or integrated with an augmented reality apparatus 108 for a user 110. The computing device 2102 can cause one or more display layers of the augmented reality apparatus 108 to present synthetic graphical images to the user 110. Generally, a computing device 2102 may be implemented as, for example, an end-user device (e.g., a smart phone) of a user 110, a corporate device (e.g., a server side device or data center hardware), an on-chip system or system-on-a-chip (SOC) (e.g., that is integrated with the augmented reality apparatus 108), or any other suitable computing device or computing system.

In an example implementation as shown in FIG. 1, the image compensation module 118 is executing at one location (e.g., within a housing of the augmented reality apparatus 108). However, the image compensation module 118 can be executing in the cloud (e.g., on a network-side computing device) if transmission latency is sufficiently small, and such an example implementation as also shown in FIG. 21. Alternatively, at least a portion of the image compensation module 118 may be executing at both a client-side computing device and a server-side computing device. In such an implementation, the operations implemented by the image compensation module 118 as described herein may be distributed across a client-server architecture.

The example computing device 2102 as illustrated includes at least one processing system 2104, one or more computer-readable media 2106, and one or more I/O interfaces 2108 that may be communicatively coupled, one to another. Although not explicitly shown, the computing device 2102 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 2104 is representative of functionality to perform one or more operations using hardware. Accordingly, the processing system 2104 is illustrated as including one or more hardware elements 2110 that may be implemented as processors, functional blocks, and so forth. This may include implementation in hardware as an application specific integrated circuit (ASIC), a general-purpose processor, or other logic device formed using e.g. one or more semiconductors. The hardware elements 2110 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 2106 is illustrated as including memory/storage 2112. The memory/storage 2112 represents memory/storage capacity associated with one or more computer-readable media. The memory/storage component 2112 may include volatile media (e.g., random access memory (RAM)) or nonvolatile media (e.g., read only memory (ROM), flash memory, optical discs, or magnetic disks). The memory/storage component 2112 may include fixed media (e.g., RAM, ROM, or a fixed hard drive) or removable media (e.g., a flash memory card, a removable hard drive, or an optical disc). The computer-readable media 2106 may be implemented in a variety of other ways as further described below.

The input/output interface(s) 2108 are representative of functionality to allow a user to enter commands or information to computing device 2102 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a display layer, a monitor, or a projector), a speaker, a printer, a network card, a haptic vibrating device, or a combination thereof. Thus, the computing device 2102 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 2106 may include a variety of media that may be accessed by the computing device 2102. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 2102, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 2110 and computer-readable media 2106 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 2110. The computing device 2102 may be configured to implement particular instructions or functions corresponding to software or hardware modules. Accordingly, implementation of a module that is executable by the computing device 2102 as software may be achieved at least partially in hardware, e.g., through use of computer-readable storage media or the hardware elements 2110 of the processing system 2104. The instructions or functions may be executable/operable by one or more articles of manufacture (e.g., one or more computing devices 2102 or processing systems 2104) to implement techniques, modules, or examples described herein.

The techniques described herein may be supported by various configurations of the computing device 2102 and are not limited to the specific aspects of the example devices described herein. This functionality may also be implemented fully or partially through use of a distributed system, such as over a "cloud" 2114 via a platform 2116 as described below.

The cloud 2114 may include or represent a platform 2116 for resources 2118. The platform 2116 abstracts underlying functionality of hardware (e.g., one or more servers or at least one data center) and software resources of the cloud 2114. The resources 2118 may include applications or data that can be utilized while computer processing is at least partially executed on servers remote from, or distributed around, the computing device 2102. Resources 2118 may also include services provided over the Internet or through a subscriber network, such as a cellular or Wi-Fi network.

The platform 2116 may abstract resources and functions to connect the computing device 2102 with other computing devices or services. The platform 2116 may also serve to abstract a scaling of resources to provide a corresponding level of scale to encountered demand for the resources 2118 implemented via the platform 2116. Accordingly, in an interconnected device embodiment, implementation of functionality described herein may be distributed throughout the illustrated system of FIG. 21, or at least throughout the cloud 2114 along with the computing device 2102. For example, functionality may be implemented in part on the computing device 2102 as well as via the platform 2116 that abstracts the functionality of the cloud 2114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. At least one computing device operative in a digital medium environment to present a synthetic graphical image in conjunction with a direct-view of a real-world scene in a manner to reduce visibility of an image artifact, the device comprising:
   a synthetic graphic module configured to obtain an emissive graphic and an attenuation graphic including a boundary defining a size of the attenuation graphic;
   a camera configured to detect a size of a pupil of an eye of a user;
   a light region compensation module configured to produce an expanded attenuation graphic by expanding the boundary of the attenuation graphic based on the detected size of the pupil thereby increasing the size of the attenuation graphic;
   a display device including an emissive display layer and an attenuation display layer; and
   a display module configured to:

instruct the emissive display layer to present the emissive graphic to the eye of the user; and instruct the attenuation display layer to present the expanded attenuation graphic to block light of the real-world scene from the emissive graphic and to prevent development of an unintended light region on the emissive graphic.

2. The device as described in claim 1, wherein the camera is an inward-facing camera.

3. The device as described in claim 1, wherein the size of the pupil of the eye of the user is based on a detected radius or diameter of the pupil of the eye.

4. The device as described in claim 1, wherein the light region compensation module is further configured to produce the expanded attenuation graphic by applying a convolutional kernel tuned based on the attribute of the eye of the user.

5. The device as described in claim 4, wherein the convolutional kernel is further tuned based on a distance measured from a position of the emissive display layer.

6. The device as described in claim 1, wherein the light region compensation module is further configured to produce the expanded attenuation graphic by applying a minimum filter tuned based on the attribute of the eye of the user.

7. The device as described in claim 1, wherein the unintended light region comprises an inner light halo bordering at least a portion of the emissive graphic.

8. The device as described in claim 1, wherein:
the light region compensation module is further configured to produce the expanded attenuation graphic by dilating an attenuation matte; and
the display module is further configured to instruct the attenuation display layer to present the expanded attenuation graphic based on the dilated attenuation matte.

9. The device as described in claim 1, further comprising:
a dark region compensation module configured to generate a replica graphic to reproduce an appearance of the real-world scene in a region in which the light from the direct-view of the real-world scene is blocked by the expanded attenuation graphic,
wherein the display module is further configured to instruct the emissive display layer to present to the eye of the user the replica graphic in the region.

10. In a digital medium environment to present a synthetic graphical image in conjunction with a direct-view of a real-world scene in a manner to reduce visibility of an image artifact, a method implemented by a device, the method comprising:
obtaining, by the device, an emissive graphic and an attenuation graphic having a boundary;
detecting, by a camera of the device, a size of a pupil of an eye of a user;
dilating, by the device, the boundary of the attenuation graphic to produce an expanded attenuation graphic based on the detected size; of the pupil of the eye of the user
presenting, by the device, the emissive graphic to the eye of the user using an emissive display layer; and
presenting by the device, the expanded attenuation graphic to block light of the real-world scene from the emissive graphic and to prevent development of an unintended light region on the emissive graphic.

11. The method as described in claim 10, further comprising detecting the size of the pupil of the eye of the user using an inward-facing camera.

12. The method as described in claim 11, wherein the size of the pupil of the eye of the user is based on a detected radius or diameter of the pupil of the eye.

13. The method as described in claim 10, wherein the light region compensation module is further configured to produce the expanded attenuation graphic by applying a convolutional kernel tuned based on the size of the eye of the user.

14. The method as described in claim 13, wherein the convolutional kernel is further tuned based on a distance measured from a position of the emissive display layer.

15. The method as described in claim 10, wherein the light region compensation module is further configured to produce the expanded attenuation graphic by applying a minimum filter tuned based on the attribute of the eye of the user.

16. The method as described in claim 10, wherein the unintended light region comprises an inner light halo bordering at least a portion of the emissive graphic.

17. The method as described in claim 10, wherein:
the light region compensation module is further configured to produce the expanded attenuation graphic by dilating an attenuation matte; and
the display module is further configured to instruct the attenuation display layer to present the expanded attenuation graphic based on the dilated attenuation matte.

18. The method as described in claim 11, further comprising:
a dark region compensation module configured to generate a replica graphic to reproduce an appearance of the real-world scene in a region in which the light from the direct-view of the real-world scene is blocked by the expanded attenuation graphic,
wherein the display module is further configured to instruct the emissive display layer to present to the eye of the user the replica graphic in the region.

19. In a digital medium environment to present a synthetic graphical image in conjunction with a direct-view of a real-world scene in a manner to reduce visibility of an image artifact, a system comprising:
means for obtaining an emissive graphic and an attenuation graphic having a boundary;
means for detecting a size of a pupil of an eye of a user;
means for dilating the attenuation graphic by expanding the boundary using a convolutional kernel to produce an expanded attenuation graphic based on the detected size of the pupil of the eye of the user;
means for presenting the emissive graphic to the eye of the user using an emissive display layer; and
means for presenting the expanded attenuation graphic to block light of the real-world scene from the emissive graphic and to prevent development of an unintended light region on the emissive graphic.

* * * * *